US005943498A

United States Patent [19]
Yano et al.

[11] Patent Number: 5,943,498
[45] Date of Patent: *Aug. 24, 1999

[54] MICROPROCESSOR, METHOD FOR TRANSMITTING SIGNALS BETWEEN THE MICROPROCESSOR AND DEBUGGING TOOLS, AND METHOD FOR TRACING

[75] Inventors: Tatsuo Yano, Hyogo; Takashi Miyamori, Kanagawa, both of Japan

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,023

[22] Filed: Dec. 28, 1995

[30] Foreign Application Priority Data

Dec. 28, 1994 [JP] Japan .................................. 6-339958

[51] Int. Cl.$^6$ ...................................................... G06F 9/45
[52] U.S. Cl. ............................................................ 395/704
[58] Field of Search .................................. 395/704, 306, 395/308, 183.01, 183.03, 183.06, 183.07, 185.01, 185.04, 500

[56] References Cited

U.S. PATENT DOCUMENTS

| | | | |
|---|---|---|---|
| 4,463,421 | 7/1984 | Laws | 395/500 |
| 4,630,195 | 12/1986 | Hester et al. | 395/566 |
| 4,644,469 | 2/1987 | Sumi | 395/421.01 |
| 4,788,683 | 11/1988 | Hester et al. | 395/183.06 |
| 4,970,641 | 11/1990 | Hester et al. | 395/733 |
| 5,084,814 | 1/1992 | Vaglica et al. | 395/306 |
| 5,263,153 | 11/1993 | Intrater et al. | 395/185.04 |
| 5,345,580 | 9/1994 | Tamaru et al. | 395/500 |
| 5,592,677 | 1/1997 | Intrater et al. | 395/800.34 |

FOREIGN PATENT DOCUMENTS

| | | |
|---|---|---|
| 0271910 | 2/1987 | European Pat. Off. . |
| 0313848 | 9/1988 | European Pat. Off. . |
| 2200482 | 12/1987 | United Kingdom . |

OTHER PUBLICATIONS

Electronic Design, vol. 38, No. 9, May 10, 1990, pp. 29–30., Dave Bursky, "Dedicated Emulation Logic on Chip Debugs Digital Processsor's Hardware and Software".
European Search Report, EP 95 12 0260, May 2, 1996.

Primary Examiner—Tariq R. Hafiz
Assistant Examiner—Peter J. Corcoran, III

[57] ABSTRACT

A system provides debugging functions for high-speed processors by adding a comparatively small amount of hardware to the microprocessor. A debugging module which receives part of the debugging function is placed in a microprocessor and is connected with a debugging tool outside the processor. In the debugging module, a processor core in the processor accesses and executes a monitor program in the debugging tool 60 through the debugging module. In the normal mode, while the processor executes a user program, the debugging module receives trace information and sends it to the debugging tool and also performs tasks related to the breakpoints.

2 Claims, 23 Drawing Sheets

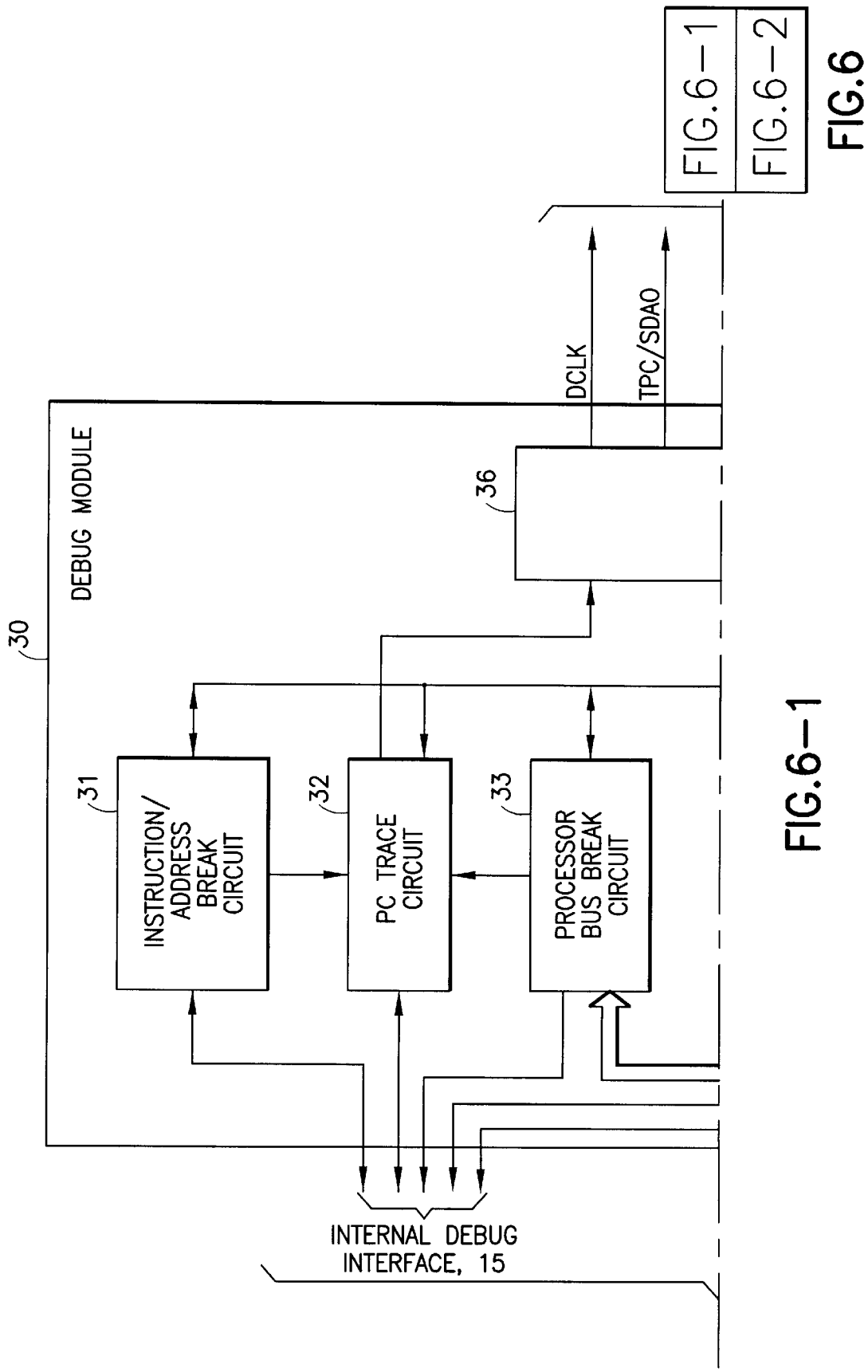

MICROPROCESSOR, METHOD FOR
TRANSMITTING SIGNALS BETWEEN THE
MICROPROCESSOR AND DEBUGGING
TOOLS, AND METHOD FOR TRACING

FIELD OF THE INVENTION

The present invention concerns a debugging system for debugging microcomputer application systems.

BACKGROUND OF THE ART

FIG. 1 shows example 1 of the prior art which is a debugging system that is generally called a ROM monitor. A serial interface 80 for connecting with a host computer 90 is provided on a user target system 70, and a monitor program 41 is stored in memory 40. Microprocessor 10 accesses I/O 50, memory 40, and register 11 by running monitor program 41. Furthermore, execution control of user programs is performed by using software break instructions.

FIG. 2 shows example 2 of the prior art. A serial interface 12, needed for communication with debugging tool 100, and a sequencer 13 for interpreting and executing the electrical signals sent from the debugging tool 100, are contained in microprocessor 10 on user target system 70. According to received signals, sequencer 13 temporarily halts the execution of the user program's accessing of register 11, or accessing of memory 40 or I/O 50 by using bus controller 14. Furthermore, execution control of user programs is performed by using hardware break points or software break instructions.

Since signals from serial interface 12 often cannot be connected directly to host computer 90, debugging tool 100 converts the commands from host computer 90 to electrical signals that can be connected directly to microprocessor 10, and converts signals from microprocessor 10 to a data format host computer 90 understands.

FIG. 3 shows example 3 of the prior art which is a debugging system that is generally called an in-circuit emulator. During debugging, microprocessor 10 on user target board system 70 is removed or made inactive, and the probe of debugging tool 110 is connected thereto for running debugging microprocessor 120 instead. Debugging microprocessor 120 controls the execution of the user programs, accesses data in memory 40, and accesses I/O 50 by executing the monitor program stored in monitor program memory 130 on the debugging tool. Moreover, debugging microprocessor 120 executes programs stored in memory 40 on the user target system just as though the microprocessor 10 were executing them. Moreover, debugging tool 110 has a trace memory 140, and can trace the state of the processor bus of debugging microprocessor 120. Debugging microprocessor 110 outputs the trace information that is not available from microprocessor 10. By doing so, some of the internal state of the processor that cannot be traced from the processor bus alone can be traced.

FIG. 4 shows example 4 of the prior art which is a debugging system that is generally called a preprocessor. By connecting the probe of a logic analyzer 150 to processor bus 90 of microprocessor 10 on user target system 70, accesses to memory 40 and I/O 50 of microprocessor 10 can be traced.

Since the operations and circuit structures of the examples of the prior art explained in FIGS. 1 through 4 are well known to those skilled in the art, no further explanation will be provided here.

Problems the Present Invention Seeks to Solve

In example 1 of the prior art, since the monitor program runs on the user memory, if an operation of the memory system of the user's target system is not complete, there are cases in which the monitor itself does not operate in a stable manner. Moreover, if there is no room left in the memory of the target system, the address space to be occupied by the monitor may not be available. Furthermore, since some of the user interrupt must be used for the entry into the monitor mode, debugging is sometimes impossible, depending on the kind of program. Moreover, it is necessary to provide circuits such as a serial interface circuit in the target system that may not be used after the debugging. Also, since no resources for debugging, such as hardware break points are provided, the debugging functions are poor, and traces cannot be obtained.

In example 2 of the prior art, since a sequencer is incorporated in the microprocessor, and the sequencer accesses the registers, the logic circuits for connection with the debugging tool become complex, and the surface area they require on the chip becomes large. Moreover, when additional registers or the like are provided, the sequencer must be updated. Furthermore, traces cannot be obtained in this prior art example.

In example 3 of the prior art, since the debugging tool is connected to all of the pins of the microprocessor on the user target, the probe becomes expensive, and the contact of the probe is often unstable. Moreover, when switching accesses between the memory on the target and the monitor memory in the debugging tool, the buses must be switched rapidly; therefore, it is difficult to implement with processors running at a high operating frequency. If there are derivative microprocessors, because their packages, pin counts and pin assignment are different, though essentially the same debugging tool can be used, different debugging tools must be prepared with probes for the respective derivative microprocessors. Moreover, connecting the probe has an influence on the signals used in the user target, which may sometimes make the operation of the user target itself unstable.

Though example 4 of the prior art is effective with respect to tracing, even with high-frequency processors, it cannot perform tracing with respect to processors with internal cache memories while the cache is being hit. Moreover, with respect to the processors with internal queues, it is not possible to determine whether fetched instructions are executed or not. Furthermore, there is no function for controlling the execution of the user program, and it is not possible to read the contents of the user memory or the I/O.

SUMMARY OF THE INVENTION

In order to solve the problems of example 1 of the prior art, the monitor memory is provided in the debugging tool, the monitor program is operated by using signals dedicated to the debugging tool, an interrupt dedicated to the debugging tool is prepared, and a hardware break function is incorporated in the microprocessor. In order to solve the problems of example 2 of the prior art, the registers, the user memory, and the I/O are accessed by using a monitor program. In order to solve the problems of example 3 of the prior art, the logic circuits for running monitor programs in the monitor memory in the debugging tool, the logic circuits for performing execution control including hardware break points, and the logic circuits for outputting the PC information of the executed instructions are incorporated in the microprocessor. Moreover, pins dedicated to connection with the debugging tool are provided in the microprocessor, and only these pins are connected with the debugging tool.

Further, a function is added which lowers the clock frequency only during the execution of the monitor program. In order to solve the problems of example 4 of the prior art, the logic circuit for executing a monitor program on the monitor memory in the debugging tool, the logic circuit for execution control including hardware break points, and the logic circuit for outputting PC information of the executed instructions are incorporated into the microprocessor.

EXPLANATION OF SYMBOLS

Figure 1:
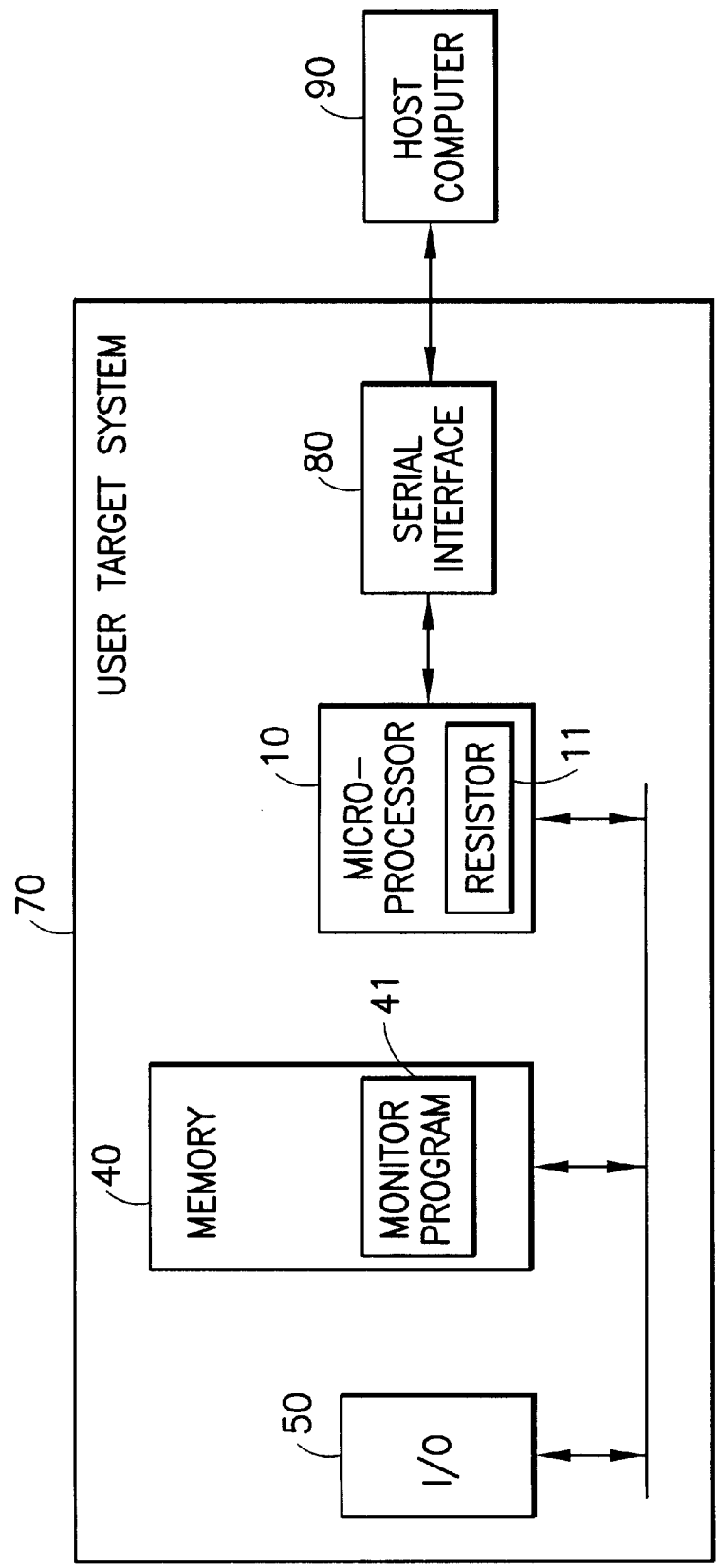
FIG. 1: Diagram showing the structure of example 1 of the prior art.
Figure 2:
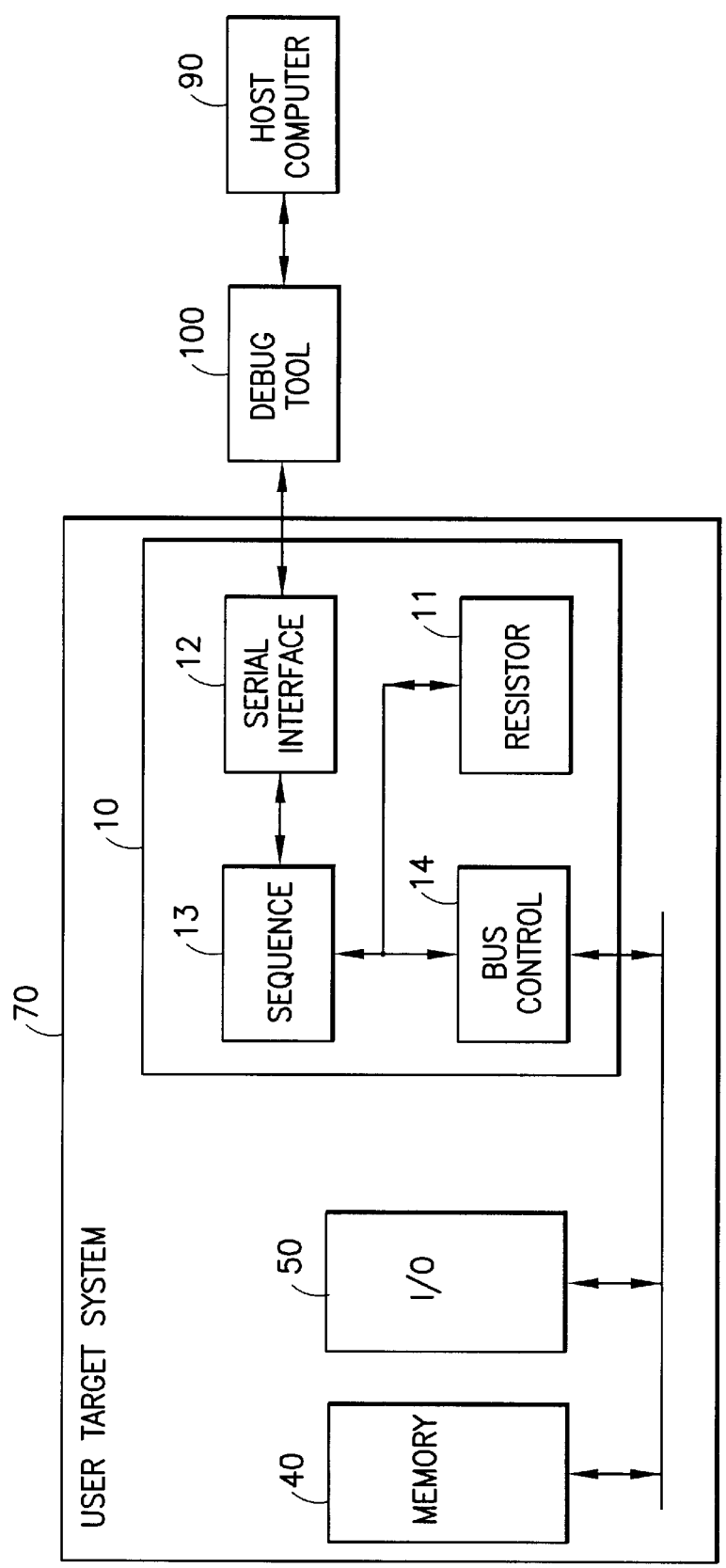
FIG. 2: Diagram showing the structure of example 2 of the prior art.
Figure 3:
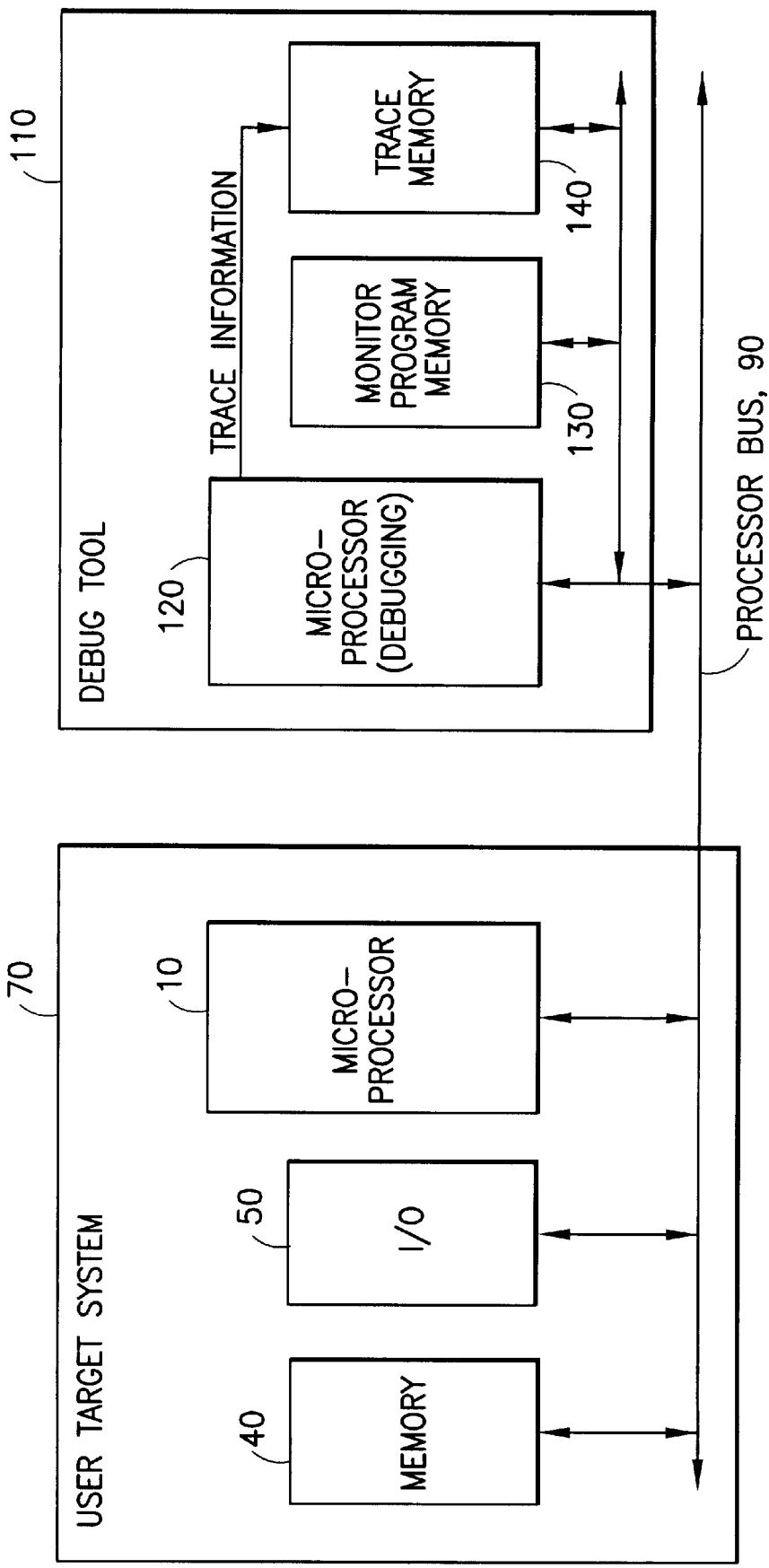
FIG. 3: Diagram showing the structure of example 3 of the prior art.
Figure 4:
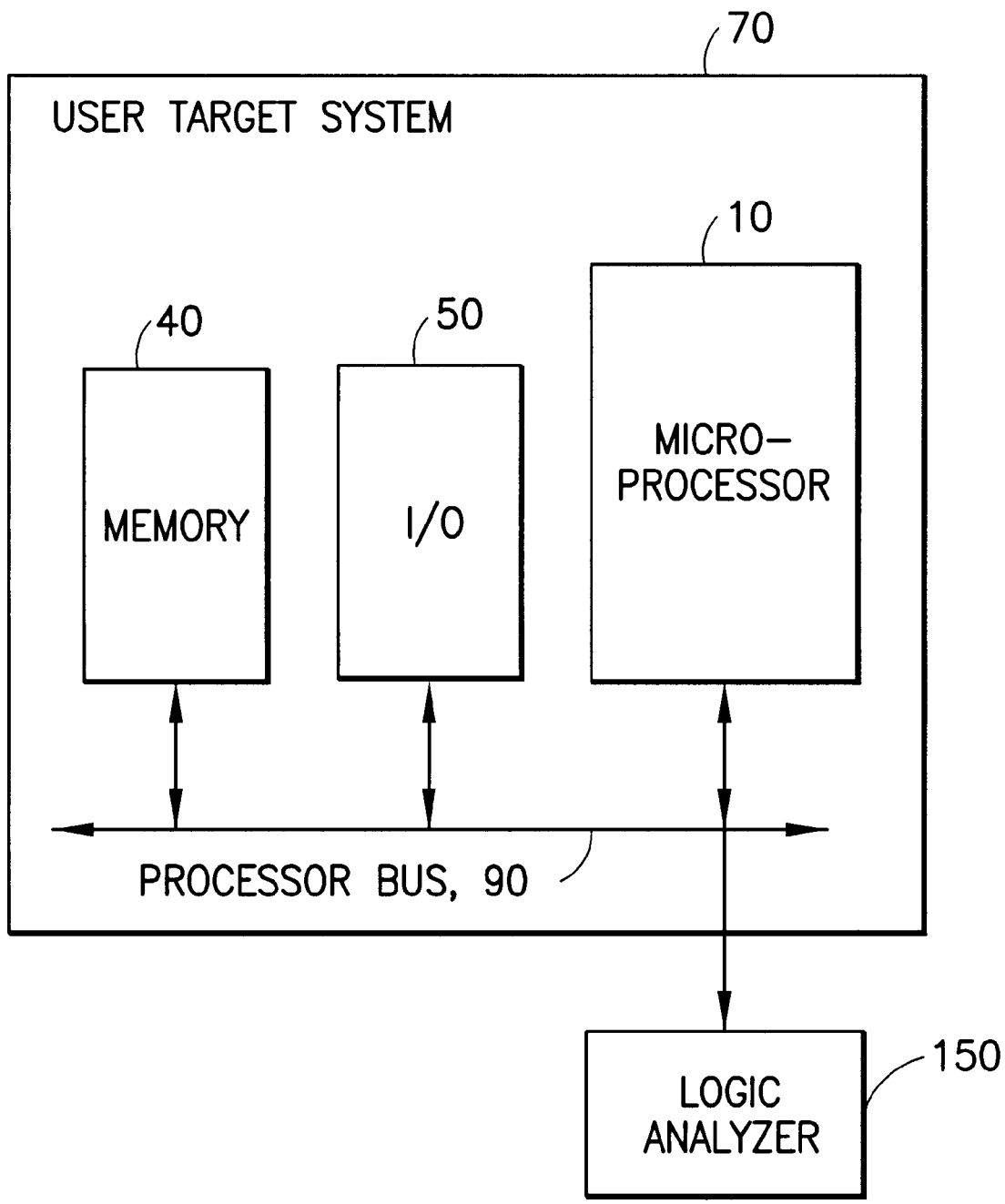
FIG. 4: Diagram showing the structure of example 4 of the prior art.

10: microprocessor
15: internal debugging interface
16: internal processor bus
20: processor core
30: debugging module
31: instruction/data address break circuit
32: PC trace circuit
33: processor bus break circuit
34: serial monitor bus circuit
35: register circuit
36: external interface circuit
37: frequency-dividing circuit
38: power source switch
40: memory
50: I/O
60: debugging tool
70: user target system
71: external debugging interface
90: processor bus
342: serial output circuit A
343: serial input circuit A
620: communication interface
630: controller
640: monitor memory
650: monitor memory interface
651: serial input circuit B
652: serial output circuit B
660: trace memory interface
661: trace memory control circuit
662: trace address counter
663: trace data register
664: trace trigger decoder
665: controller address register
667: controller data register
670: trace memory
680: run controller
690: target interface

DETAILED DESCRIPTION OF THE INVENTION

The present invention will be explained below with respect to embodiments in which the present invention is applied to a microprocessor incorporating a processor core with 32-bit addresses and a 32-bit data bus. The asterisks (*) added to signal names in the figures and during the explanation below indicate that these signals are negative logic.

Overall Explanation of Debugging System

Figure 5:
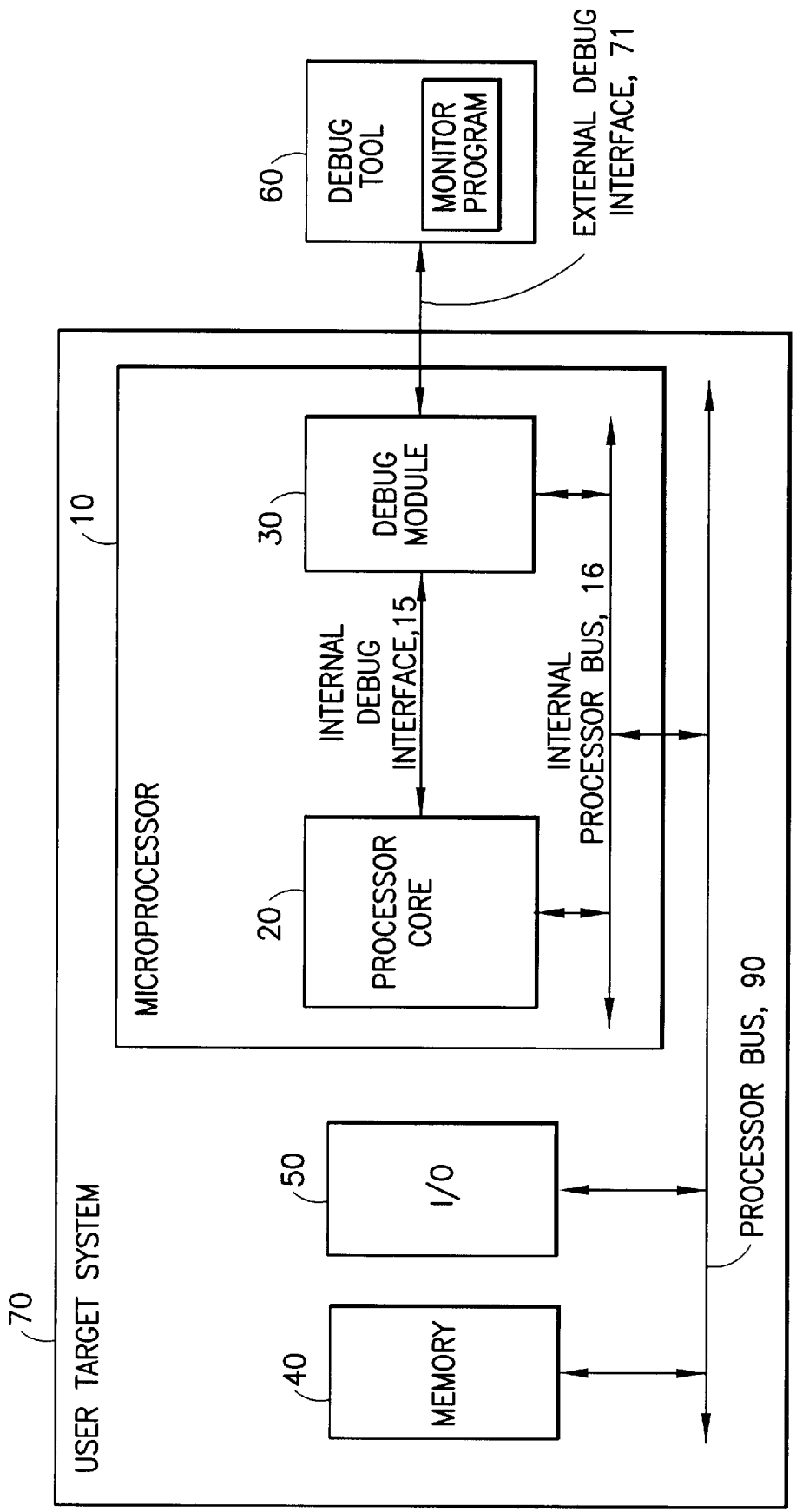
FIG. 5: Diagram showing the structure of an embodiment of the present invention.

FIG. 5 shows a structural diagram of the debugging system of an embodiment of the present invention. The debugging system comprises a user target system 70 and a debugging tool 60. User target system 70 is constructed with a microprocessor 10 that incorporates a debugging function, a memory 40, and an I/O 50. Microprocessor 10 is constructed with a processor core 20 and a debugging module 30. Processor core 20 accesses memory 40 and I/O 50 through processor bus 20 and executes programs. Processor core 20 is further connected to debugging module 30 via an internal debugging interface 15 and an internal processor bus 16. Debugging module 30 is connected to debugging tool 60 via an external debugging interface 71.

Explanation of the Execution Modes

The debugging system has two execution modes: a debugging mode in which the microprocessor executes the monitor program, and a normal mode in which the microprocessor executes the user program.

Explanation of the Debugging Mode

If a debug exception or a debug reset occurs in processor core 20, a jump to the vector address of the debug exception or reset is executed and the debugging mode is entered. The memories corresponding to these vector addresses are located in debugging tool 60. Processor core 20 executes the monitor program on debugging tool 60 through debugging module 30. The monitor program implements the execution control functions, such as the reading and writing of memory, I/O, and registers, the setting of hardware break points, the indication of the execution start address of the user program, etc. Execution of the return to the normal mode instruction by processor core 20 causes return to the normal mode to start or re-start the execution of the user program.

Explanation of the Normal Mode

In the normal mode, the debugging system executes the user program. In the normal mode, the PC (program counter) information is output to an external debugging interface 71. The debugging system requests a debug exception or debug reset to processor core 20, by means of hardware break, software break, debug interrupt, debug reset, etc., and passes control to the debugging mode.

Summary Explanation of the Debugging Module Functions

Below, explanation will be given on the serial monitor bus function which is operative during the debugging mode, and on the PC trace function, trace trigger functions, hardware break functions, software break function, debug interrupt, debug reset, and masking function which are operative in the normal mode.

Explanation of the Serial Monitor Bus Function

When processor core 20 accesses the address region dedicated to the monitor, the serial monitor bus function is executed by accessing the monitor memory in debugging tool 60 through a serial transmission path by means of the pins dedicated to debugging. When a region outside the memory dedicated to the monitor is accessed, access through the ordinary processor bus is performed. By this means, the monitor can also access the memory and I/O on the user target system. Though the bit width of the serial monitor bus is 1 bit in the embodiments below, if more microprocessor pins are available for this bus, one can also make it multiple-bit wide.

Explanation of the PC Trace Function

The PC trace function traces the program counter (PC) values while processor core 20 is executing a user program. This is implemented by outputting the PC trace information to internal debugging interface 15 when processor core 20 is executing the user program from memory 40, having debugging module 30 obtain and process it, and then outputting it to the debugging tool via the external debugging interface.

Explanation of the Trace Trigger Functions

There are three kinds of trace trigger functions: the instruction address trace trigger, the data address break and the processor bus trace trigger. The instruction address trace trigger function is implemented by comparing the value of the instruction execution address that processor core 20 outputs, to the internal debugging interface with the value of the address that has been set in the register in debugging module 30. When they match, debugging tool 60 is informed via external debugging interface 71 that a trace trigger has occurred. The data address trace trigger function is implemented by comparing the value of the data access address that processor core 20 outputs to the internal debugging interface, with the value of the address that has been set in the register in debugging module 30. When they match, debugging tool 60 is informed through external debugging interface 71 that a trace trigger has occurred. The processor bus trace trigger function is implemented by comparing the value of the data access address and the data that processor core 20 outputs to the internal debugging interface, with the value of the address and data that has been set in the register in the debugging module 30. When they match, debugging tool 60 is informed through external debugging interface 71 that a trace trigger has occurred.

Explanation of the Hardware Break Function

There are three kinds of hardware break functions: an instruction address break, a data address break, and a processor bus break. The instruction address break function is implemented by comparing the value of the instruction execution address processor core 20 outputs to the internal debugging interface, with the value of the address that has been set in the register in the debugging module 30. When they match, a debug exception is dispatched to processor core 20. The data address break function is implemented by comparing the value of the data access address processor core 20 outputs to the internal debugging interface, with the value of the address which has been set in the register in debugging module 30. When they match, a debug exception is dispatched to processor core 20. The processor bus break function is implemented by comparing the values of the data access address and the data processor core 20 outputs to the internal debugging interface, with the values of the address and data that have been set in the register in debugging module 30. When they match, a debug interrupt request is dispatched to processor core 20.

Explanation of the Software Break Function

The software break function causes a debug exception wherein processor core 20 executes a software break instruction. It causes a transfer to the debug mode.

Explanation of the Debug Interrupt Function

In the debug interrupt function, processor 20 causes a debug interrupt by asserting a debug interrupt signal. It causes a transfer to the debug mode.

Explanation of the Debug Reset Function

In the debug reset function, processor 20 causes a debug reset by asserting a debug reset signal. It initializes the internal states of processor 20 and debugging module 30, sets processor core 20 to be in the debug mode, and causes execution of the program to start from the vector address for the debug reset.

Explanation of the Masking Function

The masking function, according to its setting, masks the user interrupt during the normal mode or masks the user reset during the debug mode.

Detailed Explanation of the Overall Construction of the Debugging Module

Figures 2, 6:
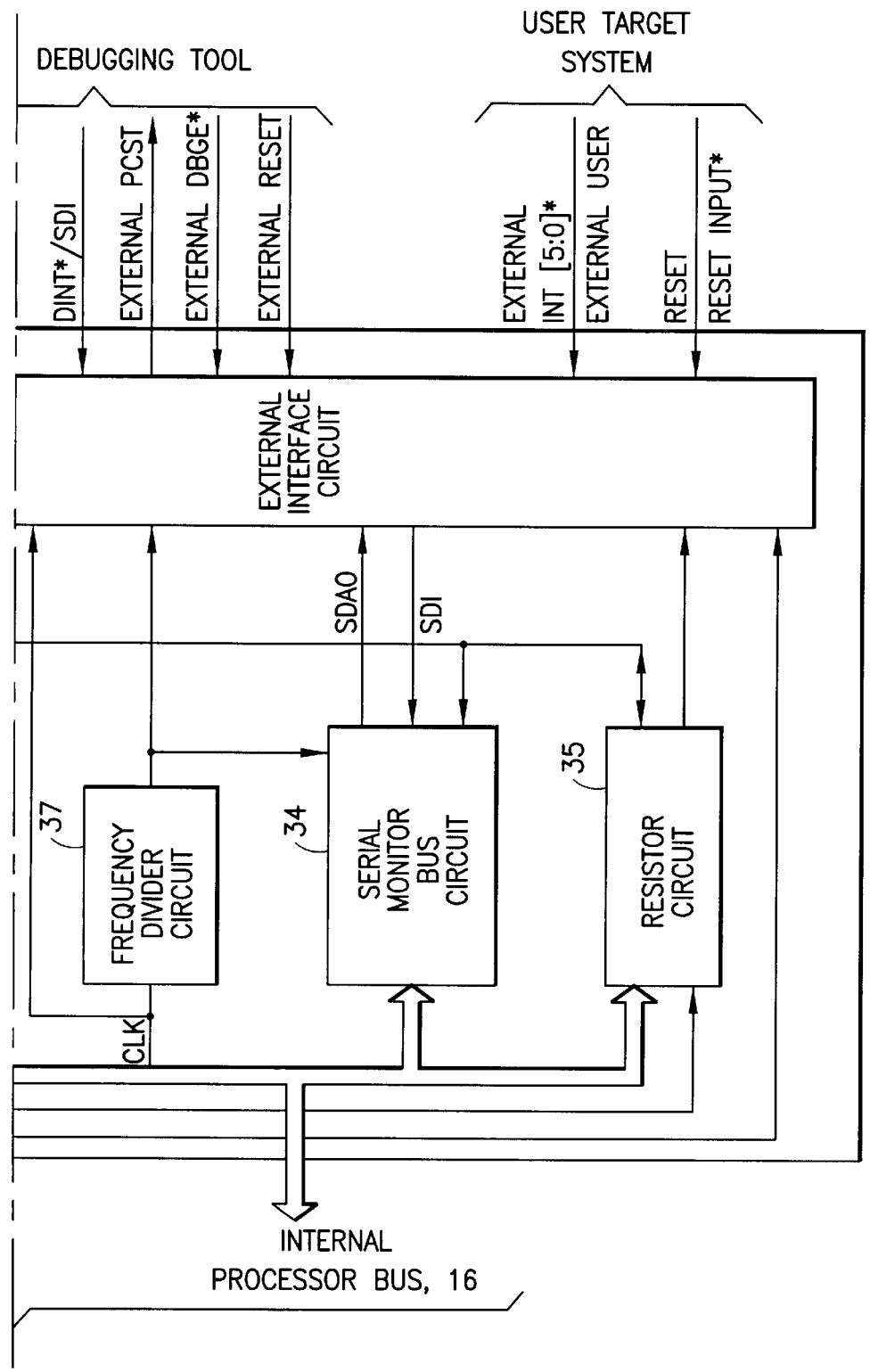
FIG. 6: Diagram showing the structure of the debugging module of an embodiment of the present invention.

Debugging module 30 will now be explained in detail. FIG. 6 shows the internal blocks of debugging module 30. Debugging module 30 contains an instruction/data address break circuit 31, a PC trace circuit 32, a processor bus break circuit 33, a serial monitor bus circuit 34, a register circuit 35, an external interface circuit 36, and a frequency dividing circuit 37.

PC trace circuit 32 is connected to processor core 20 by internal debugging interface 15. The PC information of the executed instructions, output from processor 20, is input, the information is processed, and the result is output to the external interface circuit 36.

Instruction/data address break circuit 31 is connected to processor core 20 by internal debugging interface 15. In case circuit 31 inputs the instruction address output from processor 20 and its value matches the instruction address set in register circuit 35, the circuit requests an instruction address break exception to the processor core 20, if the use of instruction address breaks has been enabled. Then, if the use of trace triggers has been enabled, the occurrence of the trigger is informed to PC trace circuit 32.

In case the circuit inputs the data address output from processor core 20 and the value matches the data address which has been set in register circuit 35, a data address break exception request is dispatched to processor core 20, if the use of data address breaks has been enabled. Then, if the use of trace triggers has been enabled, the occurrence of the trigger is informed to the PC trace circuit 32. The use of a break or a trace trigger is enabled by the value of the corresponding bit of the corresponding register in register circuit 35.

Processor bus break circuit 33 is connected to processor core 20 through internal processor bus 16. Each bit of data can be masked. This circuit monitors the bus cycles on the processor bus, and if the address and data set in register circuit 35 matches the address and data occurring during the bus cycle, it will dispatch an exception request to the processor core. Then, if the use of trace triggers has been enabled, the occurrence of the trigger is informed to PC trace circuit 32.

Serial monitor bus circuit 34 is connected to processor core 20 through an internal processor bus 16. When the processor core executes a monitor program on debugging tool 60, the circuit converts the data in parallel format into serial format, or converts the data in serial format into to parallel format for interfacing therebetween.

Register circuit 35 contains control registers which control the functions of the debugging module. An address is allocated to each register. They are connected to processor core 20 via internal processor bus 16 and internal debugging interface 15 so that the contents of the control registers can be read or written by running the monitor program. Moreover, the contents of the control register are output to each circuit in debugging module 30 and to processor core 20 to control the debugging function.

External interface circuit 36 controls PC trace circuit 32 in debugging module 30, serial monitor bus circuit 34, and the interface of processor core 20 and debugging tool 60. The masking function is also implemented within external interface circuit 36.

Frequency dividing circuit 37 divides the frequency of the clock signal CLK. The serial monitor bus circuit is operated by the frequency-divided clock CLK 2.

Detailed Explanation of the Overall Construction of the Debugging Tool

Figure 7:
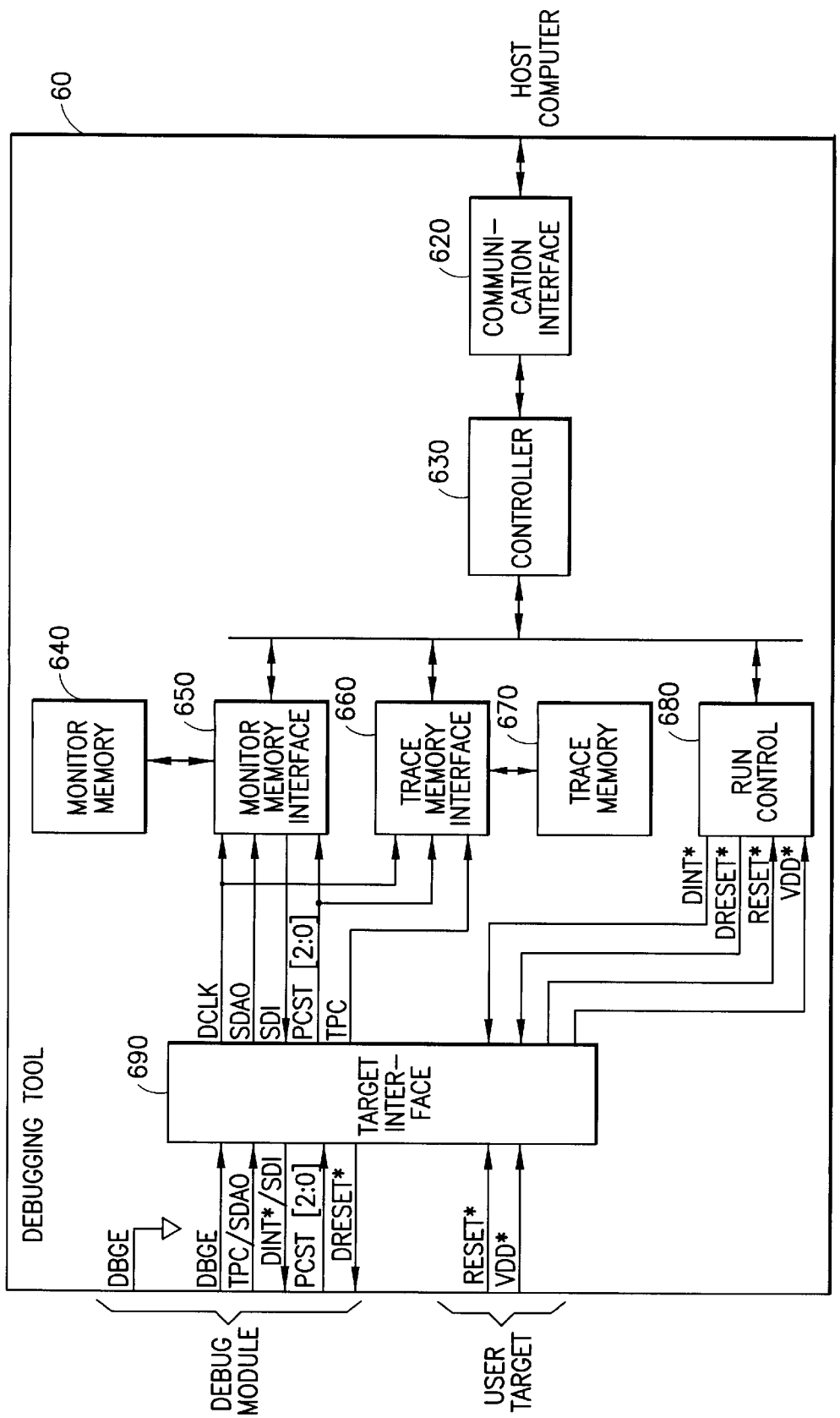
FIG. 7: Diagram showing the structure of the debugging tool of an embodiment of the present invention.

FIG. 7 shows the overall construction of the debugging tool. Debugging tool 60 contains communication interface 620, controller 630, monitor memory 640, monitor memory interface 650, trace memory interface 660, trace memory 670, run controller 680, and target interface 690.

Communication interface 620 performs communications with the host computer. Controller 630 analyzes commands sent from the host computer via communication interface 620, executes them, and returns the results. Monitor memory 640 is the memory for storing and executing the monitor program. Monitor memory interface 650 converts the serial signals from the user target system 70 into parallel signals accessible to monitor memory 640, and also arbitrates the access requests from controller 630 and the microprocessor on the user target.

Trace memory 670 is the memory for storing the PC information which is sent from microprocessor 10 on user target system 70. Trace memory interface 660 stores in trace memory 670, the PC information sent from microprocessor 10 on the user target system. Moreover, when there is an access request from controller 630, it arbitrates this request so that the storage of the PC information being sent from the microprocessor on the user target is not obstructed.

Run controller 680 inputs the user reset signal RESET* which is fed from user target system 70 and voltage VDD of the power source line of the user system. By giving the debug interrupt signal DINT* and the debug reset signal DRESET* to the user target system, it resets, stops, or executes the user program.

Target interface 690 consists of a circuit for protecting user target system 70 and debugging tool 60 when the power is turned on, and a circuit which regulates the input/output voltage according to the power source voltage of target user system 70.

Interface Signals between the Debugging Tool and the Microprocessor

There are in total twenty lines for the interface signals between the debugging tool and the microprocessor. The input/output designations show the directions when seen from the microprocessor side. The following eight lines are for the external debugging interface signals between the debugging modules 30 and the debugging tool 60:

1. DCLK: output
2. DRESET: input
3–5. PCST(2:0): output
6. SDAO/TPC output
7. SDI/DINT: input
8. DBGE: input The following signals are also connected to debugging tool 60, although they are not dedicated to the debugging tool.

9. RESET: output
10. VDD: output

Ten ground lines are also connected.

11–20. GND: ground (1) DCLK (Debug clock): output terminal;

This is the clock output to debug tool 60. The timing of all of the serial monitor bus and the PC trace interface signals is defined by this debug clock DCLK. When the serial monitor bus is functioning, DCLK is the clock obtained by frequency-dividing the operating clock of the processor core 20.

(2) DRESET* (Debug reset): input terminal (terminal with pull-up);

Debug reset input. A low-active signal. When DRESET* is asserted, the ICE module is initialized (not related to DBGE). When debugging tool 60 is not used, this terminal should not be connected.

(3) PCST (2:0) (PC trace status): output terminal;

These terminals output the PC trace status information and the serial monitor bus mode given below. The table below shows the meanings of the 3-bit codes output by the PCST.

111 (STL): pipeline stall
110 (JMP): branch/jump taken (with PC output)
101 (BRT): branch/jump taken (without PC output)

100 (EXP): exception occurred (with an exception vector code output)
011 (SEQ): sequential execution (indicating that 1 instruction was executed)
010 (TST): trace trigger output during pipeline stall
001 (TSQ): trace trigger output during execution
000 (DBM): debugging mode (0: low level, 1: high level)

Table 1

(4) DBGE* (Debugger Enable): input terminal (terminal with pull-up);

This terminal indicates whether the debugging tool 60 is connected or not. If debugging tool 60 is not connected externally, it becomes high-level because of the pull-up. Since debugging tool 60 side is made low-level, connecting the debugging tool makes it low-level.

When debugging tool 60 is not connected (when the DBGE* signal is high-level), the debug exception vector address of processor core 20 becomes a region which is released to the user, allowing the control to be transferred to a monitor prepared by the user on the debug exception. Moreover, the user reset is disabled (which initializes the debugging module function to disable the debugging functions), except for the hardware break function, reducing power consumption of the microprocessor. Moreover, all the output signals (SDAO/TPC, DCLK, PCST[2:0]) exhibit a high-impedance state.

When debugging tool 60 is connected, the debug exception vector address of processor core 20 becomes the monitor-dedicated region which is not released to the user. At this time, the user reset does not initialize the debugging module, which allows the debugging functions to be utilized, even immediately after user reset. That is, the present invention satisfies the request to observe the behavior of the user target system immediately after the user reset.

(5) SDAO/TP (Serial data and address output/target PC): output terminal;

When the microprocessor is executing a monitor program (hereinafter referred to as the debugging mode), this terminal functions as the terminal SDAO (Serial Data and Address Output) which serially outputs data/address. When the microprocessor is executing a user program (hereinafter referred to as the normal mode), it functions as the terminal TPC (Target PC) which serially outputs the target PC.

Function as SDAO

This is the signal terminal which outputs data, address, read/write and byte enable signals, serially, one bit at a time. It outputs a start bit before the beginning of each bus cycle (that is, it outputs the low level for one clock period). Its output order on reading is: a start bit (low level), A2–A19, RD, WR, BE0–BE3; on writing, the output order is: a start bit (low level), A2–A19, RD, WR, BE0–BE3, D0–D31.

Function as TPC

This is the signal for outputting the target addresses of a branch/jump instruction and a vector number of exceptions/interrupt. The target address is output in sequence from the low address A[2] to the high address A[31].

(6) SDI/DINT* (Serial data input/debug interrupt): input terminal (with pull-up);

In the debugging mode, this terminal acts as the serial data input terminal SDI (Serial data input); in the normal mode, its acts as the debug interrupt terminal DINT* (Debug interrupt).

Function as SDI

Data input signal terminal. On reading, when a start bit (low-level) is input from outside, data input will start from the next clock. On writing, when a low level is input, the bus cycle completes. The order of input on reading is: a start bit (low-level), D[0]–D[31]. On writing, only an end bit (low-level) is input.

Function as DINT*

Debug interrupt input from debugging tool 60. When debugging tool 60 is not used, this terminal should be of no connection.

(7) RESET* (Reset): output terminal;

User reset terminal. By connecting this signal to the debugging tool, for example, when there is no response from the debugging module 30, it can determine whether this is due to a user reset signal or not. Causing the debug reset immediately after the user reset can be done by keeping DRESET* active until after RESET* signal goes high.

(8) VDD (VDD): output terminal;

Power source line of the user target system. By inputting this into debugging tool 60, debugging tool 60 can find out the power source voltage of user target system 70. This allows an alteration of the threshold value of the input waveform and the voltage level of the output waveform in compliance with the power source voltage of the user target system. Moreover, when it is determined that the power source of user target system 70 is not on, the output devices of debugging tool 60 is made high-impedance to protecting them.

(9) GND (GND)

In order to match the ground levels of debugging tool 60 and user target system 70, ten ground lines are connected. They are interleaved with the above-mentioned signals (1) through (8) in the transmission cable between debugging tool 60 and user target system 70 so as to reduce the cross-talk among these signals.

Detailed Explanation of the Serial Monitor Bus Circuit

The operation of serial monitor bus circuit 34 of FIG. 6 will be explained.

Outline of the Function of the Serial Monitor Bus

During the debug mode, when processor core 20 accesses the monitor-dedicated region, the memory on debugging tool 60 is accessed through the serial monitor bus circuit 34. In write operations using the serial monitor bus, serial monitor bus circuit 34 outputs the address, the bus control signals, and the data to the SDAO signal, serially 1 bit at a time. In read operations, it outputs the address and the bus control signals serially 1 bit at a time. In read operations, it outputs the address and the bus control signals to the SDAO signal and inputs data from the SDI signal serially 1 bit at a time.

The serial monitor bus is operated by the clock CLK 2 which frequency-divides the operating clock CLK of the processor core 20. 18 bits A[19:2] of the address signal of the processor core are output to the serial monitor bus which enables to access into a 1 Mbyte memory space. Since the byte enable signal BE[3:0] of the processor core 20 is output to the serial monitor bus, byte, half-word, and 3-byte accesses are also possible. However, in the serial monitor bus, even in the cases of byte, half-word or 3-byte access, 32-bit wide data is transmitted.

When one byte, half-word or three bytes are written, the data portion corresponding to the byte position where BE[3:0] is inactive is undefined. On reading, the data at the inactive byte positions are ignored by the processor core 20, and are not read.

In the normal mode, writing to the regions dedicated to the monitor is ignored; on reading, the result is undefined. When this kind of write access has occurred, serial monitor bus circuit 34 sends an acknowledge signal, showing completion of the bus operation, to processor core 20, and then the bus operation is completed.

Figure 8:
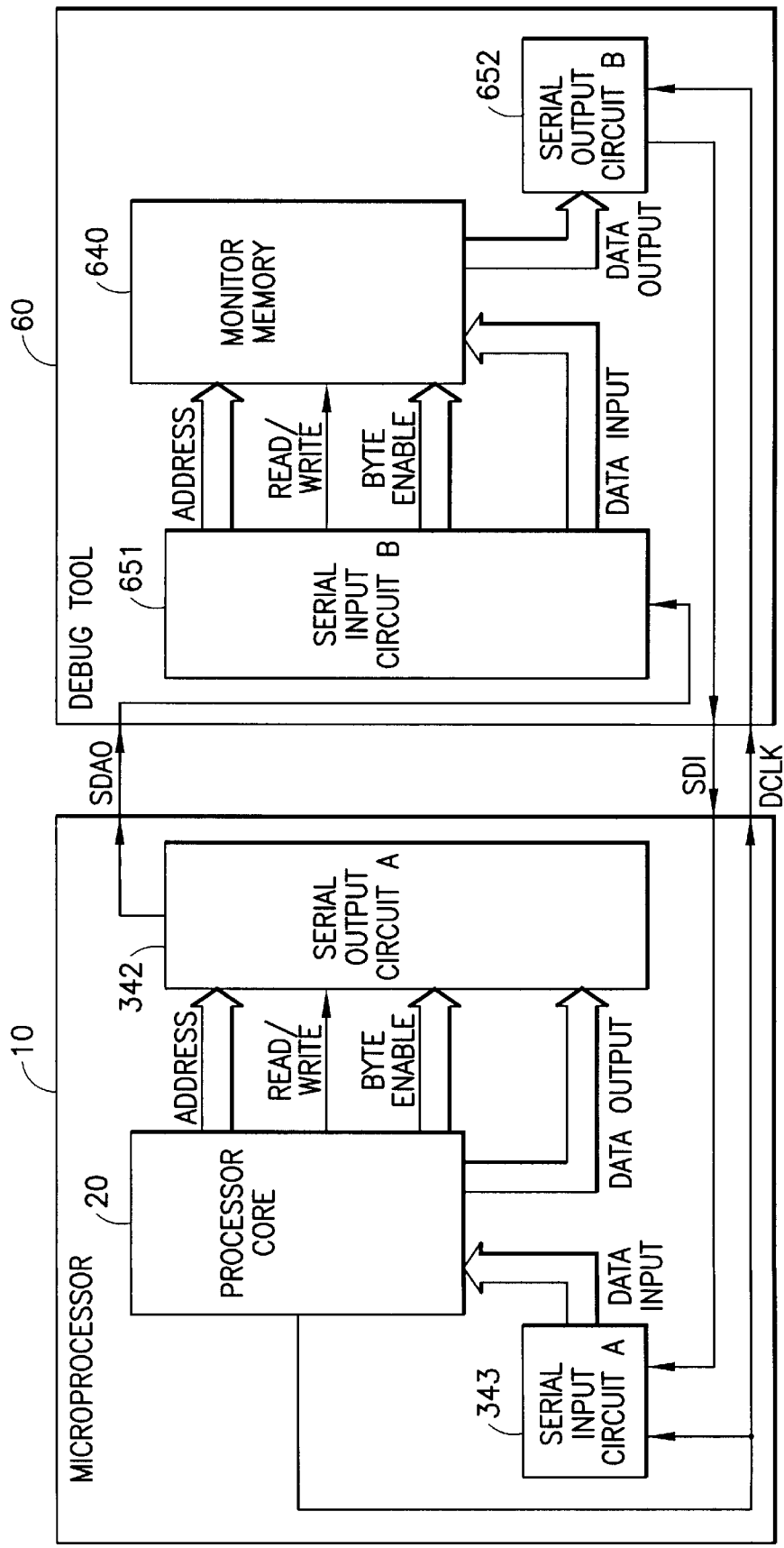
FIG. 8: Diagram showing an outline of circuits related to the serial monitor bus of an embodiment of the present invention.

Detailed Explanation of Method for Transmitting the Signals of the Serial Monitor Bus FIG. 8 shows an block diagram of the serial monitor bus. With reference to FIG. 8, the procedure of transmission of signals will be explained.

In Case the Processor Core 20 Performs a Memory Read (1) The parallel-format address, read signal, and byte enable output from the processor core 20 are converted into serial format by serial output circuit A342 and output from the SDAO.

(2) The serial monitor input circuit B651 in debugging tool 60 inputs them and converts them into parallel format and outputs the parallel format to monitor memory 640.

(3) The data in parallel format output from the memory are converted into serial format by serial output circuit B652 and are output through the SDI.

(4) The serial input circuit A343 in debugging module 30 converts them into parallel format and outputs them to processor core 20.

(5) The processor core 20 reads the data in parallel format.

In case the Processor Core 20 Performs a Memory Write (1) The address, write signal, byte enable and data, in parallel format as output from processor core 20, are converted into serial format by serial output circuit A342 and output from the SDAO.

(2) Serial input circuit B651 in debugging tool 60 inputs and converts them into parallel format and outputs the signals to monitor memory 640.

(3) When the writing to monitor memory 640 is completed, serial output circuit B652 outputs low level for one clock to the SDI.

(4) Serial input circuit A343 in microprocessor 10 in user target system 70, when this low level has been input, notifies processor core 20 that the write cycle has been completed.

(5) The processor core 20 ends the write cycle.

Detailed Explanation of the Timing of the Serial Monitor Bus Operation

The serial monitor bus operation will be explained in detail below, using timing charts.

Read bus operation of serial monitor bus

Figure 9:
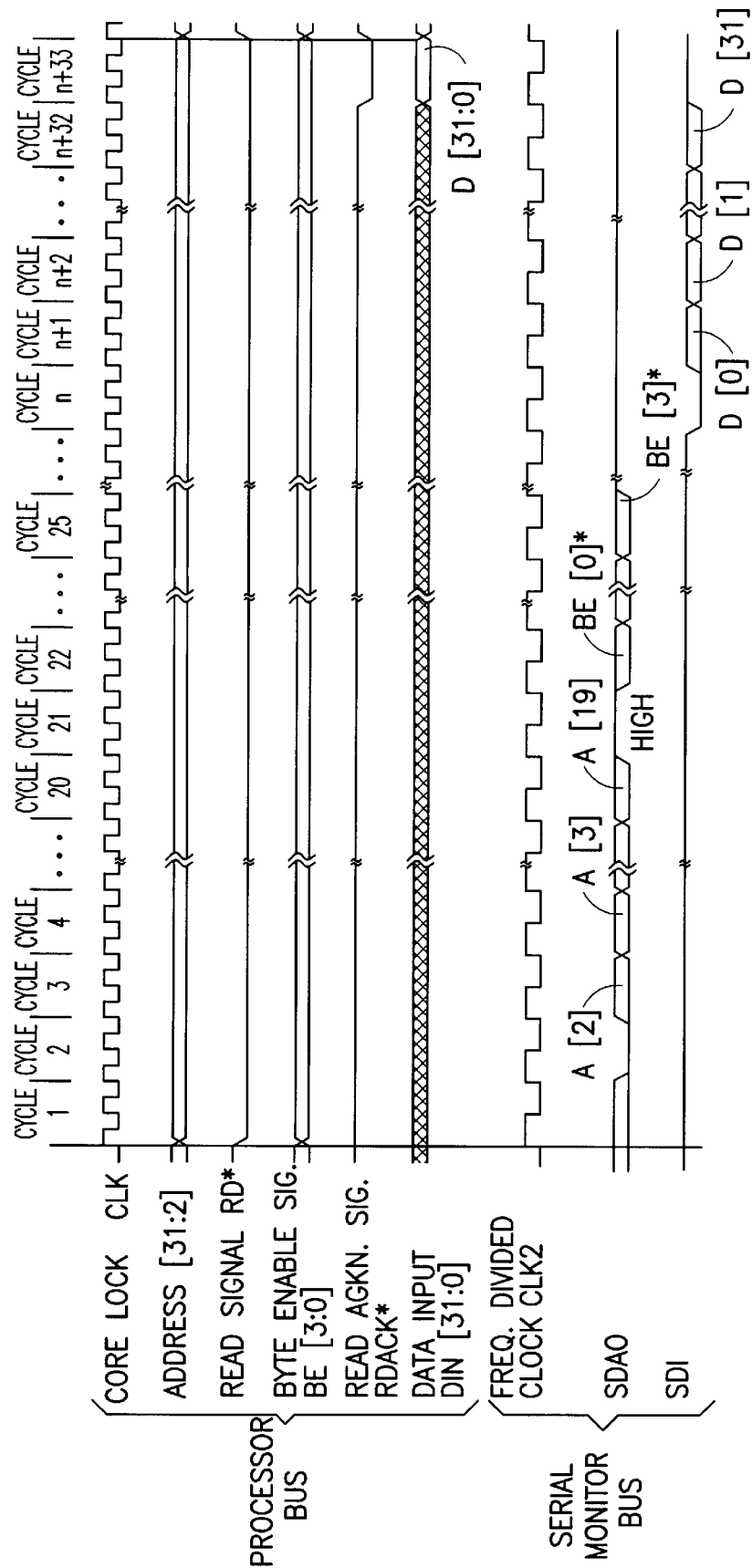
FIG. 9: Timing chart of the write bus operation of the serial monitor bus in an embodiment of the present invention.

FIG. 9 shows the timing chart of the read bus operation of the serial monitor bus.

(1) Processor core 20 starts a read bus operation to the monitor-dedicated region (cycle 1). Processor core 20 outputs the address to be accessed to the processor bus in parallel format, asserts a read signal, and asserts the byte enable signals at the byte positions to be read.

(2) Serial monitor bus circuit 34 outputs low level for one clock of the CLK 2, which is the frequency-divided clock of the core clock CLK, to the SDAO signal when the start of the read bus operation to the monitor region is recognized (cycle 2).

(3) Serial monitor bus circuit 34 outputs the address A[2]–A[19], a high level (indicating a read) and the byte enable signals BE[0]*–BE[3]* which have been output in the read bus operation of processor core 20, to the SDAO signal in this order, each taking one clock of the CLK2 signal (cycles 3–25).

(4) Monitor memory interface 650 in debugging tool 60 inputs the address A[2]–A[19], the high level (indicating a read) and the byte enable signals BE[0]*–BE[3]* which have been output to the SDAO signal, in this order, one bit at every clock of DCLK. The address and byte enable signals are then converted into parallel format and output to monitor memory 640.

(5) Monitor memory interface 650 converts the parallel-format data output from monitor memory 640 into serial format. Before the data are output, a low level is output to the SDI signal for one clock (cycle n). Following this, the data are output in sequence from D[0] to D[31], one bit at a time, synchronized with DCLK (cycles n+1 to n+32).

(6) Serial monitor bus circuit 34, when a low level is detected in the SDI (cycle n), reads in the data D[0]–D[31] from the next cycle, for each clock of DCLK (cycles n+1 to n+32).

(7) Serial monitor bus circuit 34 asserts a response signal of the read bus of the processor core 20 and outputs the 32 bits of data which were read to the processor bus in parallel format (cycle n+33).

(8) Processor core 20 reads the data on the processor bus and completes the read bus operation.

Write Bus Operation of the Serial Monitor Bus

Figure 10:
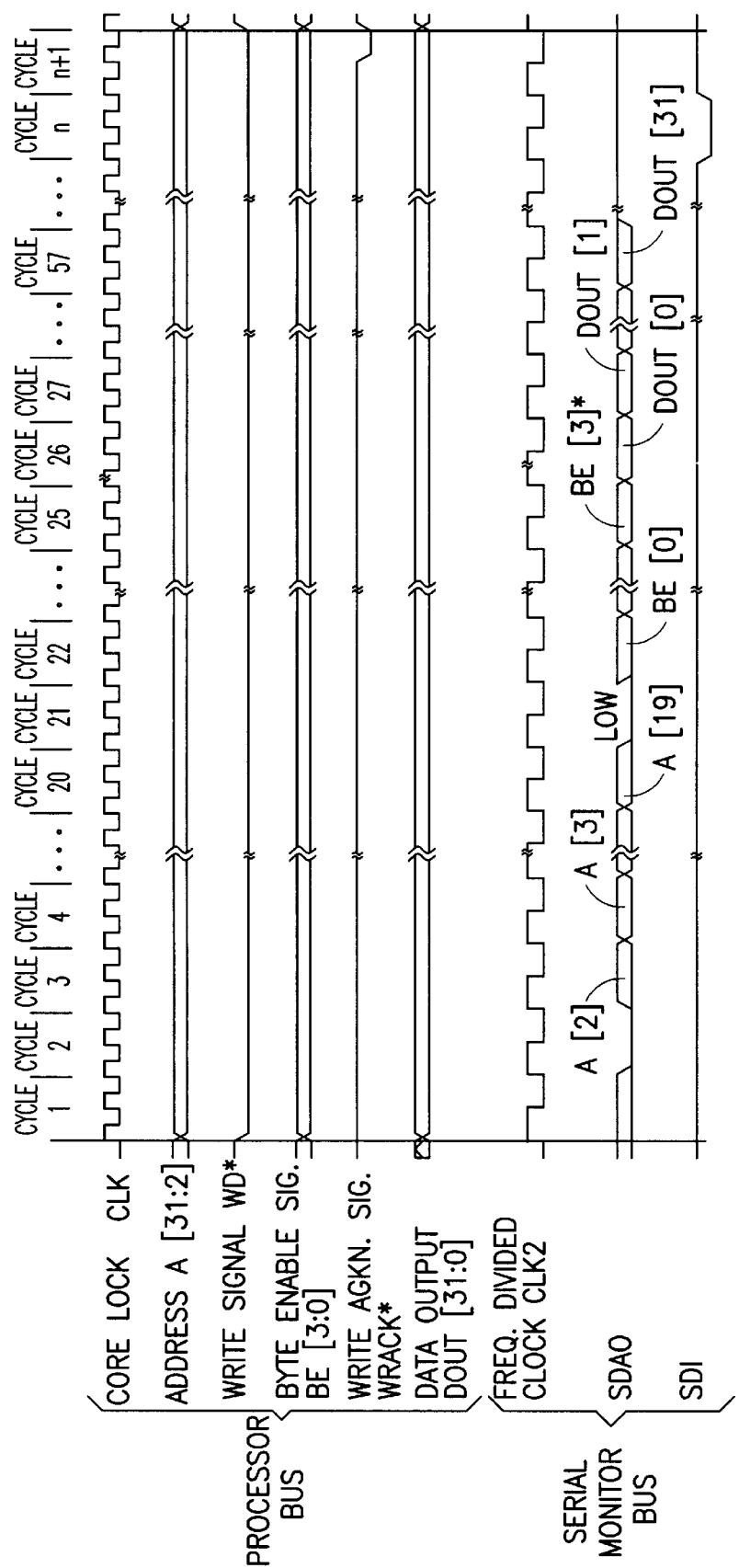
FIG. 10: Timing chart of the write bus operation of the serial monitor bus in an embodiment of the present invention.

FIG. 10 shows the timing chart of the write bus operation of the serial monitor bus.

(1) Processor core 20 starts a write bus operation to the monitor-dedicated region (cycle 1). Processor core 20 outputs the address to be accessed to the processor bus and asserts a write signal. The byte enable signal of the position of the byte to be written is asserted.

(2) Serial monitor bus circuit 34 outputs a low level for one clock of the CLK 2 which is the frequency-divided clock of the core clock CLK when the start of the write bus operation to the monitor region is recognized (cycle 2).

(3) Serial monitor bus circuit 34 outputs the address A[2]–A[19], a low level (indicating a read), the byte enable signals BE[0]*–BE[3]*, and the write data DOUT[0]–DOUT[31] which have been output in the write bus operation of the processor core 2, in this order, to the SDAO signal, one bit at every clock of CLK2 signal (cycles 3–57).

(4) monitor memory interface 650 in debugging tool 60 inputs the address A[2]–A[19] (the high level indicating a read), the byte enable signals BE[0]*–BE[3]*, and the write data DOUT[0]–DOUT[31], which have been output to the SDAO signal, in this order, one bit at every clock of DCLK. The address, byte enable signals and write data are then converted into parallel format and output to monitor memory 640.

(5) When monitor memory interface 650 has completed the writing to monitor memory 640, a low level is output to the SDI signal for one clock (cycle n).

(6) Serial monitor bus circuit 34, when a low level is detected in the SDI, asserts a write bus response signal to processor core 20 (cycle n+1).

(7) Processor core 20 completes the write bus operation.

PC trace circuit

The terms "indirect jump," "direct jump," and "branch" will be defined below.

Indirect jump: A jump in which the jump address cannot be determined in the instruction itself, such as a jump to an address stored in a register.

Direct jump: A jump in which the jump address is determined by an address at which the instruction itself is located and the instruction code.

Branch: A jump in which the branch address can be determined by the sum of the address at which the instruction itself is located and part of portion of the instruction code. In a branch, whether the jump is actually taken or not is determined by conditions. If the jump is actually taken, it is called "branch taken"; if it is not taken, it is called "branch not taken."

PC traces include the following two kinds of trace modes.

Real-time trace mode: In this mode, the execution of the processor core 20 is always performed in real time, but when the next indirect jump occurs during the target PC output of the previous indirect jump, outputting of the target PC of the indirect jump occurred first is aborted, and outputting of the new target PC is started.

Non-real-time trace mode: In this mode, when adjacent indirect jumps occur as described above, the pipeline processing of the processor core 20 is halted until the target PC of the previously produced indirect jump is completely output. In this way, the real time execution of the processor core 20 is impaired, but the target PC of the indirect jump is always completely output.

The PC trace circuit 32 inputs the following signals from the processor core 20.

Debugging mode signal: This signal indicates whether the processor core 20 is in the debugging or the normal mode.

Pipeline execution signal: This signal indicates that an instruction has been executed.

30-bit target PC signal [31:0]: This signal indicates target address of branch or jump instruction or a vector address of an exception. It is effective when the following indirect jump signal, direct jump signal, branch taken signal, or exception occurrence signal is asserted.

Indirect jump signal: This signal indicates that an indirect jump has been executed.

Direct jump signal: This signal indicates that a direct jump has been executed.

Branch taken signal: This signal indicates that an actually taken branch instruction has been executed.

Exception occurrence signal: This signal indicates that an exception has occurred.

The PC trace circuit 32 outputs the following signals to the processor core 20 for completely performing the PC trace.

Pipeline stall request signal: When in non-real-time trace mode, in which target PC outputs are performed completely, this signal stalls the pipeline of processor core 20. PC trace circuit 32 asserts this signal and stalls the pipeline of processor core 20 when a subsequent indirect jump occurs while an indirect jump target PC is being output. When the target PC during the output is completely output, this signal is negated and the pipeline processing of the processor core 20 resumes.

PC trace circuit 32 inputs trigger request signals from instruction/data address break circuit 31 and processor break circuit 33. It also inputs the status of the bit which switches the trace mode, allocated to a register in register circuit 35.

PC trace circuit 32 converts the PC trace information which processor core 20 outputs during normal mode operation to a 1-bit PC output (TPC signal) and 3-bit status information (PCST[2:0] signals) and outputs them to debugging tool 60. The PCST[2:0] and TCP signals will be explained below.

PCST[2:0]: At each clock, the execution status of the instructions is output to PCST[2:0]. In the following explanation, "0" represents the low level and "1" the high level.

111 (STL): pipeline stall: This indicates that the execution of an instruction was not completed, in a status in which there is no trace trigger output.

110 (JMP): branch/jump taken (PC output exists): This indicates that a branch instruction is taken or a jump instruction is performed, and output of the target address (address of branch or jump) to the TPC signal was started.

101 (BRT): branch/jump taken (no PC output exists): This indicates that a branch instruction is taken or a jump instruction is performed, but there is no output of the target address (address of branch or jump) to the TPC signal.

100 (EXP): exception occurred (code output of exception vector exists): This indicates that exception has occurred. It simultaneously indicates that code output of exception vector to TPC signal was started. The code is of 3 bits and is output to the TPC signal in the order of the lowest code (0), code (1) and code (2).

| Kind of exception | Vector address | | Code |
|---|---|---|---|
| Reset, Nmi | BFCO_0000 | (100) | 4 |
| UTLB (BEV = 0) | 8000_0000 | (000) | 0 |
| UTLB (BEV = 1) | BFCO_0100 | (110) | 6 |
| Other (BEV = 0) | 8000_0080 | (001) | 1 |
| Other (BEV = 1) | BFCO_0180 | (111) | 7 |

Here, BEV is one bit in the register in the register circuit 35; the vector address of the exception handling can be changed by its value.

011 (SEQ): sequential execution (indicating that an instruction has been executed): This indicates that an instruction has been executed wherein that instruction is other than a taken jump or branch (JMP, BRT) in a state in which there is no trace trigger output request (TSQ). This code is also output when a branch has not been taken.

010 (TST): trace trigger is output during pipeline stall: This indicates that an instruction address trace trigger or processor bus trace trigger occurred in a clock at which no instruction was completed.

001 (TSQ): Trace trigger is output during execution: This indicates that an instruction address trace trigger or processor bus trace trigger occurred in a clock at which no instruction was completed.

000 (DBM): Debugging mode: This code is not output in the normal mode.

TPC: This is the signal for outputting the target address of a branch or jump instruction. The output of the target address is started from the clock in which the 110 (JMP) was output to the PCST[2:0]. The target address is output one bit at every clock from the low A(2).

The 3-bit code of the exception vector is output to the PCST[2:0] from the clock in which the 100(EXP) was output. The code is output one bit at every clock from the low code(0).

Since the target address is output in a 1-bit serial manner to the TPC signal, the next branch or jump instruction or exception sometimes occurs while the previous branch or jump instruction is being output to the TPC signal. The priority of the target address output to the TPC in this case is defined as follows.

(1) When the trace mode is the real-time mode, if a new indirect jump occurs during a target PC output, the previous target PC output is aborted and the target PC output of the new indirect jump is always started.

(2) When the trace mode is the non-real-time mode, if a new indirect jump occurs during a target PC output, the pipeline processing of the processor core is halted until the previous target PC output is completed. The processor core pipeline processing is restarted and the output of the target PC of the new indirect jump is started after that target PC output is completed.

(3) When an exception has occurred during a target PC output, the vector number (3 bits) of the exception is always output, after which the interrupted PC output is restarted.

(4) When a new direct jump or branch has be taken during a target PC output, the output of the target address of this direct jump or branch is not performed. With respect to a direct jump or branch, its target PC is output only when another target PC is not being output when it is taken.

In the case of a direct jump or branch, even if the target address is not output, if the address of that instruction is known, the address of the jump or branch destination can be determined by referring to the code of that instruction stored in memory. The address of that instruction is determined by the clock count between the execution of that instruction and the previously occurred direct jump or branch.

Examples of PC trace outputs will now be explained with reference to the drawings.

EXAMPLE 1

PC trace of branch instruction

Figure 11:
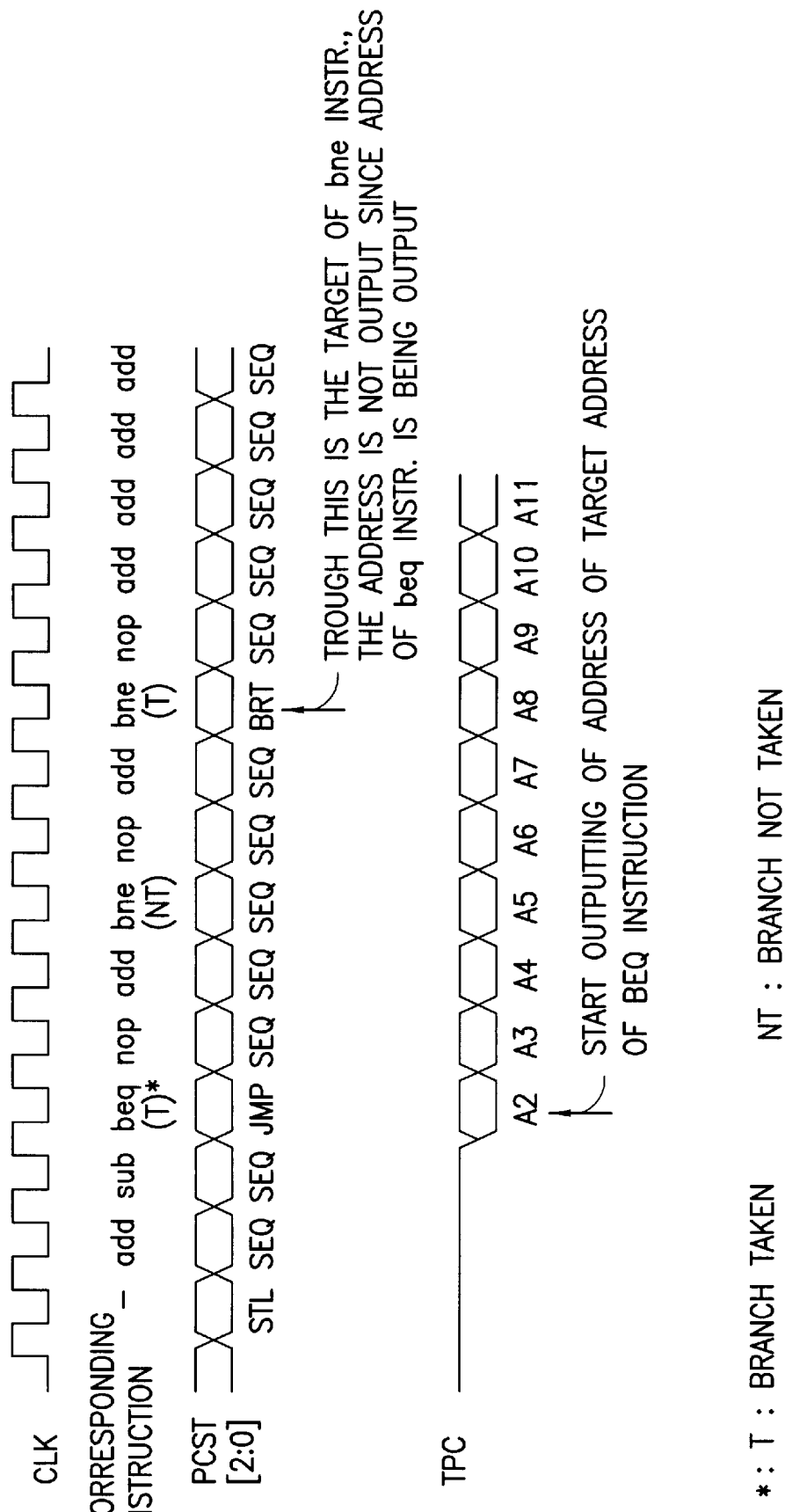
FIG. 11: Timing chart showing an example of the PC trace output of a branch instruction in an embodiment of the present invention.

FIG. 11 shows an example of a PC trace output of a branch instruction. When the first branch instruction beq is taken, no target PC is being output to TPC. Therefore, the JMP code is output to PCST[2:0], and the output of the target PC to TPC is started. When the branch instruction bne is not taken, the SEQ code is output to PST[2:0]. The second taken branch instruction bne is a direct jump; since the target PC of the first branch instruction is being output, the target PC is not output to the TPC. The BRT code is output to the PCST[2:0].

EXAMPLE 2

PC trace of indirect jump instruction

Figure 12:
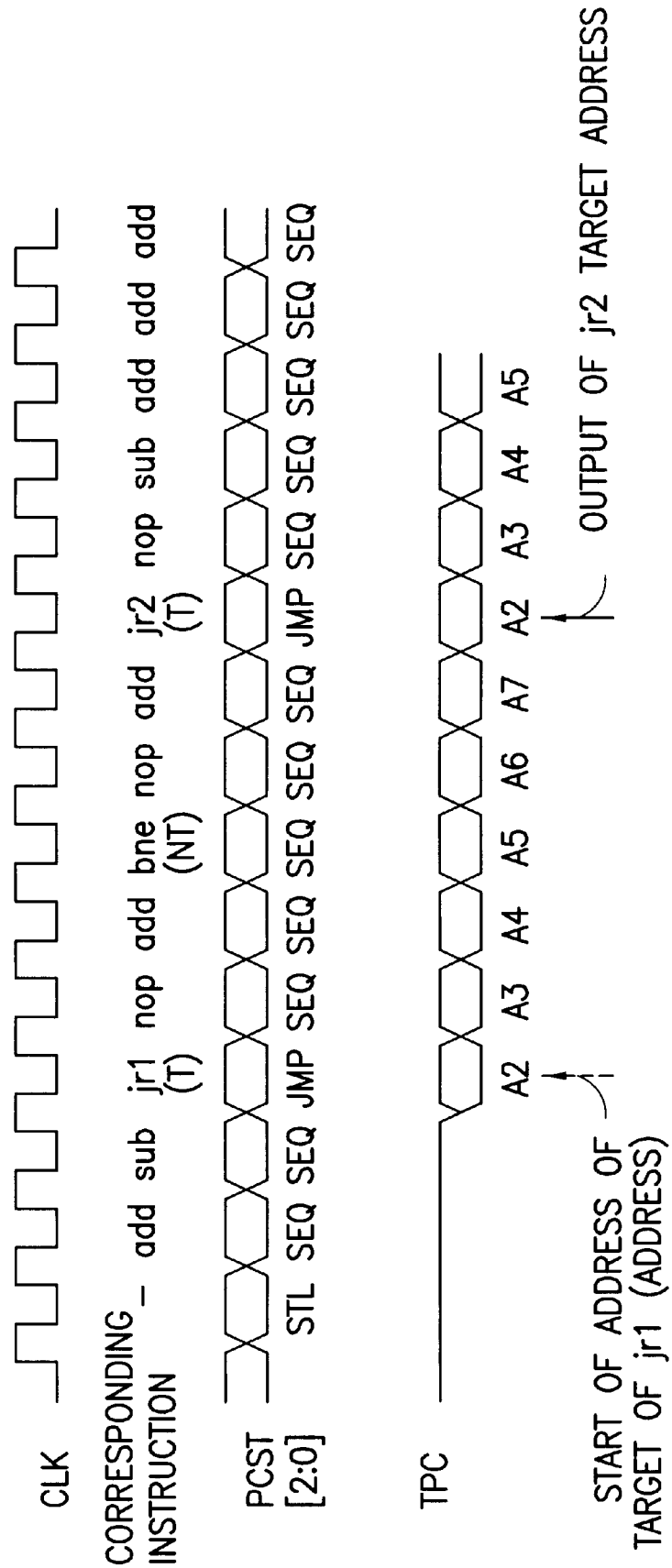
FIG. 12: Timing chart showing an example of the PC trace output of an indirect jump instruction in an embodiment of the present invention.

FIG. 12 shows an example of a PC trace output of an indirect jump instruction. For the first indirect jump instruction jr1, the JMP code is output to the PCST[2:0], and the output of the target PC to the TPC is started. For the branch instruction bne which is not taken, the SEQ code is output to PCST[2:0]. For the second indirect jump code jr2, the output of the target PC of the first indirect jump instruction is aborted, and the target PC of jr2 is output to the TPC. The JMP code is output to the PCST[2:0].

EXAMPLE 3

PC trace of exception and indirect jump instruction

Figure 13:
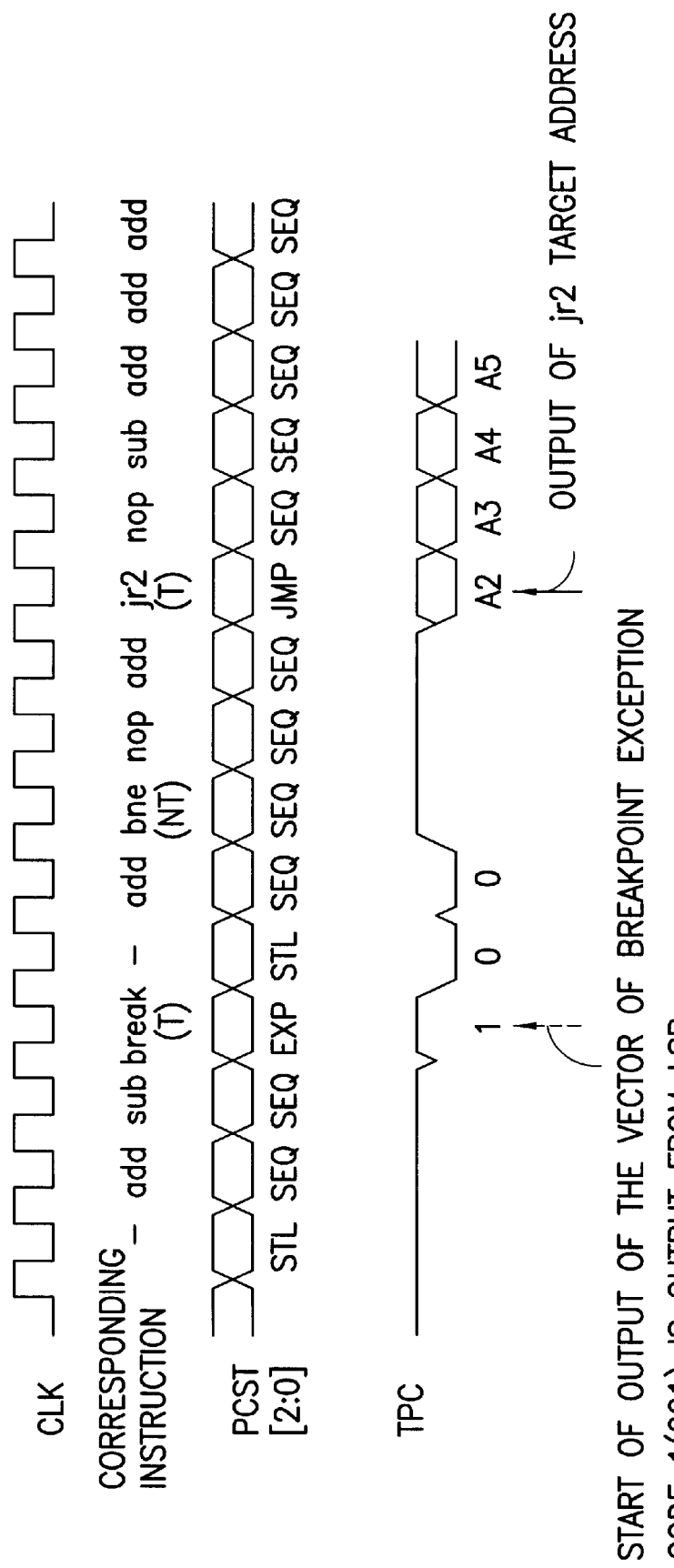
FIG. 13: Timing chart showing an example of the PC trace output of an exception and indirect jump instruction in an embodiment of the present invention.

FIG. 13 shows an example of a PC trace output of an exception and an indirect jump instruction. When a software break instruction break exception occurs, the EXP code is output to the PCST[2:0] and the output of the exception vector code to the TPC is started. For the branch instruction bne which is not taken, the SEQ code is output to the PCST[2:0]. For the indirect jump instruction jr2, the target PC of the jr2 is output to the TPC, and the JMP code is output to the PCST[2:0].

EXAMPLE 4

PC trace when no PC is being output at the time a debug exception occurs

Figure 14:
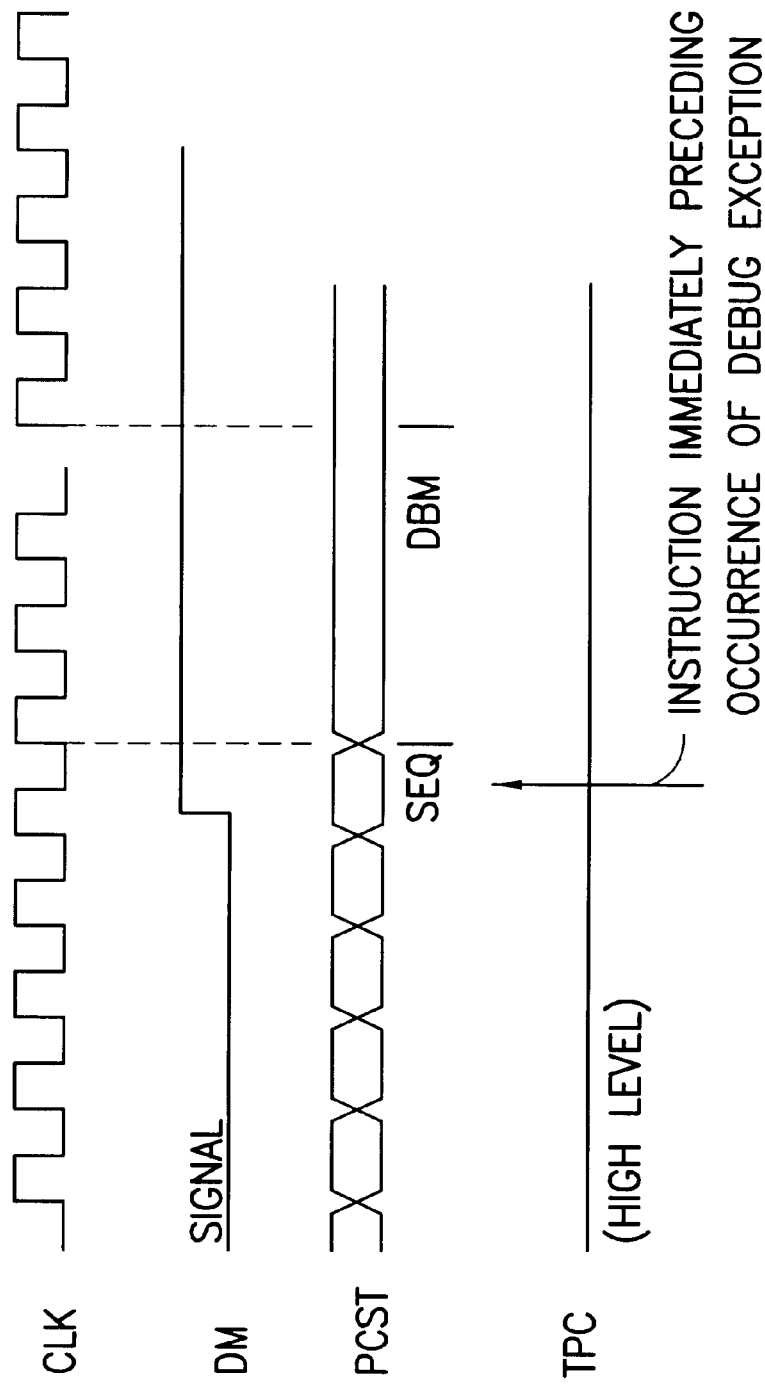
FIG. 14: Timing chart showing an example of the output timing of the PCST[2:0] when a debug exception occurs in an embodiment of the present invention.

FIG. 14 shows an example of the output timing of the PCST[2:0] when a debug exception occurs. In this figure, the DM signal is an internal signal in processor core 20, and when it is in a high-level, it indicates the debugging mode, low-level indicating the normal mode. When processor core 20 causes a debug exception or debug reset, the processor enters into the debugging mode. At this time, PC trace circuit 32 outputs the DBM code to the PCST[2:0] output. When no target PC is output, the processor enters into the debugging mode immediately after the completion of the execution of the instruction which caused the debug exception. The PC trace information up to the instruction immediately before the occurrence of the debug is output.

EXAMPLE 5

PC trace when a PC is being output at the time a debug exception occurs

Figure 15:
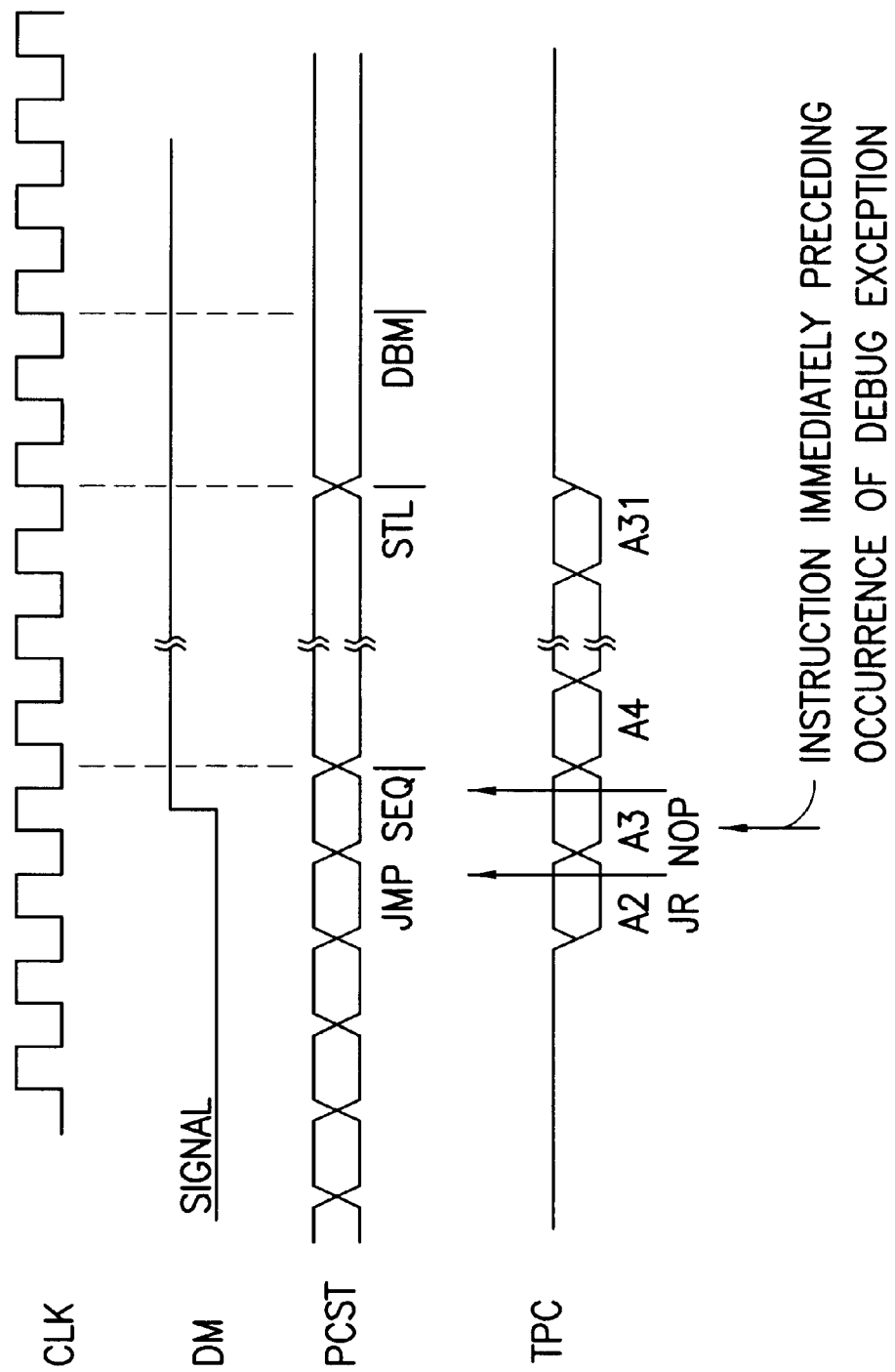
FIG. 15: Timing chart showing the output timing of the PCST[2:0] in a case in which a target PC is output when a debug exception occurs in an embodiment of the present invention.

FIG. 15 shows the output timing of the PCST[2:0] in a case in which a target PC is being output when a debug exception occurs. When the target PC is being output, the processor enters into the debugging mode after this target PC is completed. The PC trace information up to the instruction immediately before the occurrence of the debug exception is output. When a target PC is being output, STL is output to the PCST[2:0].

EXAMPLE 6

PC trace at the time of transition from the debugging mode to the normal mode

Figure 16:
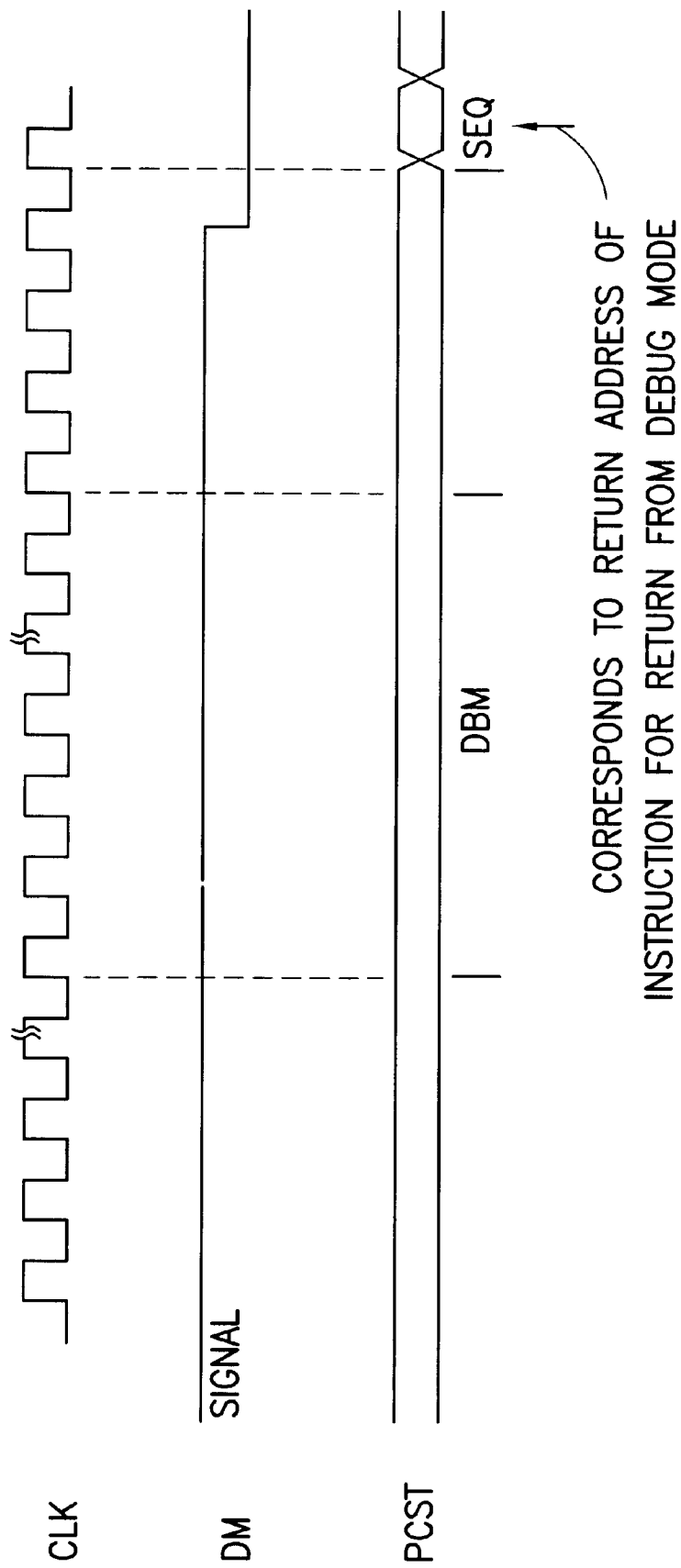
FIG. 16: Timing chart showing the output timing of the PCST[2:0] when there is a return from the debugging mode in an embodiment of the present invention.

FIG. 16 shows the output timing at the time of a return from the debugging mode. The instructions up to the branch delay slot instruction of the return instruction from the debug exception or debug reset, DERET instruction, belong to the debugging mode. From the instruction of the return address of the DERET instruction, the processor enters into the normal mode, and the PC trace becomes effective.

Detailed Explanation of the Trace Triggers

The output of trace triggers to the PCST[2:0] signal will be explained.

When either an instruction address trace trigger, data address trace trigger, or processor bus trace trigger has occurred, the trace trigger information is output to the PCST[2:0] by the following logic.

(1) Case in which a branch instruction which is taken or a jump instruction is being executed at that time, or an exception is occurring: Here, if a trace trigger does not occur, the JMP, BRT, or EXP code should be output to the PCST[2:0]. In this case (1), even if a trace trigger occurs, the output of the PCST[2:0] is not changed and is sustained, and the trace trigger information is output in the immediately following case (2) or (3).

(2) Case in which the pipeline is being stalled: Here, if a trace trigger does not occur, the STL code should be output to the PCST[2:0]. In this case (2), if a trace trigger occurs, the TST code is output to the PCST[2:0].

(3) Cases other than (1) and (2), i.e., cases in which the pipeline is performing sequential execution: Here, if a trace trigger does not occur, the SEQ code should be output to the PCST[2:0]. In this case (3), if a trace trigger occurs, the TSQ code is output to the PCST[2:0].

Embodiments will be shown below with reference to waveform diagrams.

EXAMPLE 1

Figure 17:
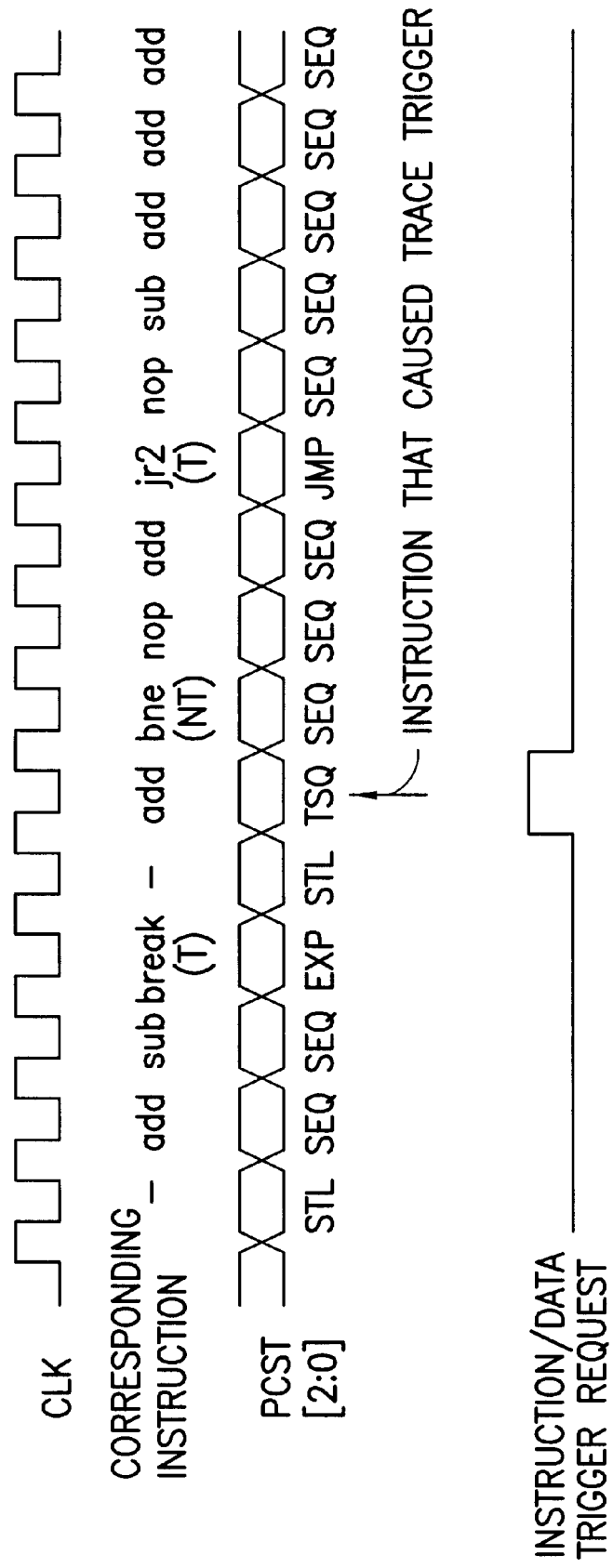
FIG. 17: Timing chart of an example of the occurrence of a trace trigger during the successive execution of ordinary instructions.

Example of occurrence of trace trigger: FIG. 17 shows an example in which a trace trigger occurs during sequential execution of ordinary instructions. Since the trace trigger occurred during an "add" instruction execution, the code TSQ of the trace trigger is output.

EXAMPLE 2

Figure 18:
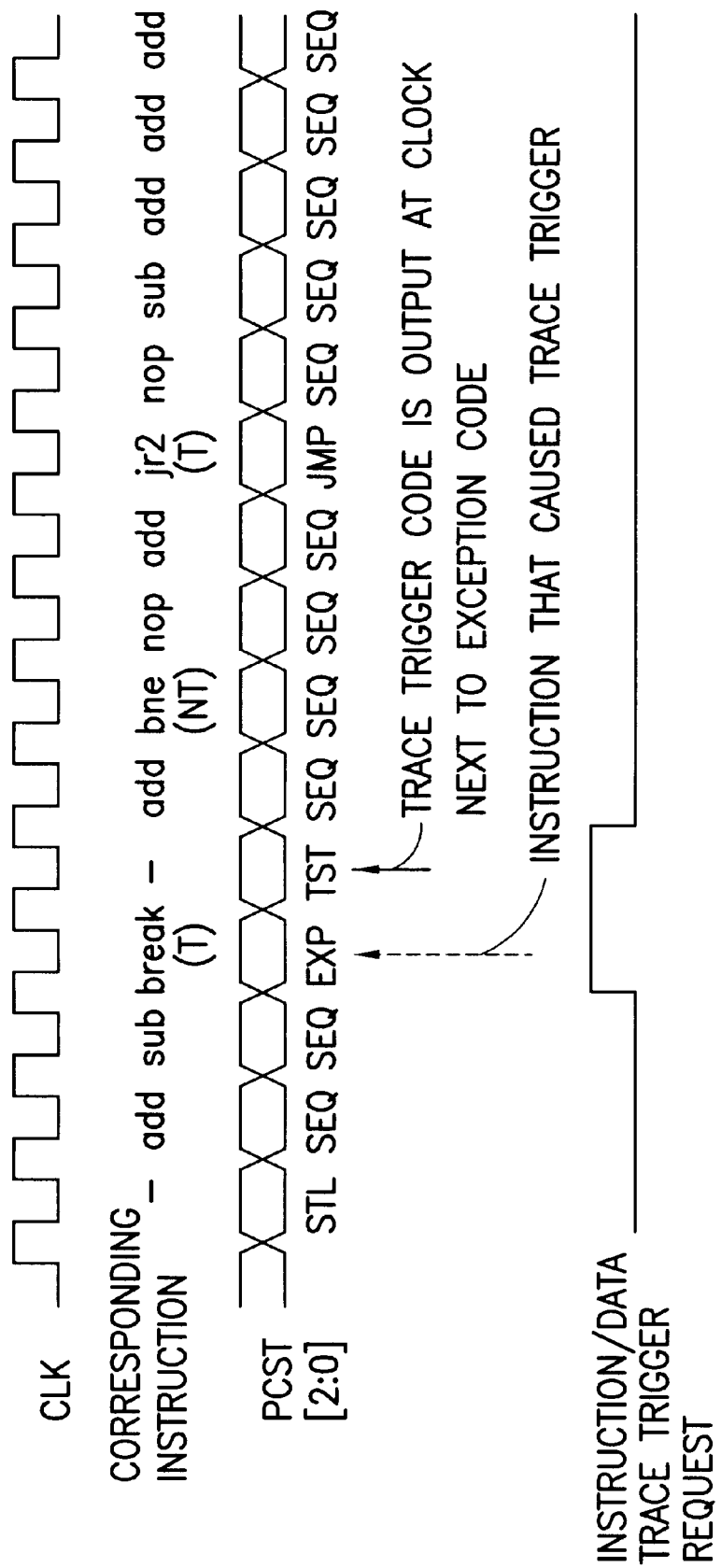
FIG. 18: Timing chart of an example of a case in which a trace trigger has occurred during the execution of an exception-occurring instruction.

Example of the case in which a trace trigger occurs during the execution of the instruction that causes the exception: FIG. 18 shows an example in which a trace trigger occurs during the execution of the instruction that causes the exception. The trace trigger occurs during the execution of a software break instruction "break", but the code EXP for the exception occurrence is output onto the PCST[2:0]

signal in the clock of the "break" instruction execution, and the code of the trace trigger is output in the next clock. In this example, since the status of the next clock is a stall status, the TST code is output.

EXAMPLE 3

Figure 19:
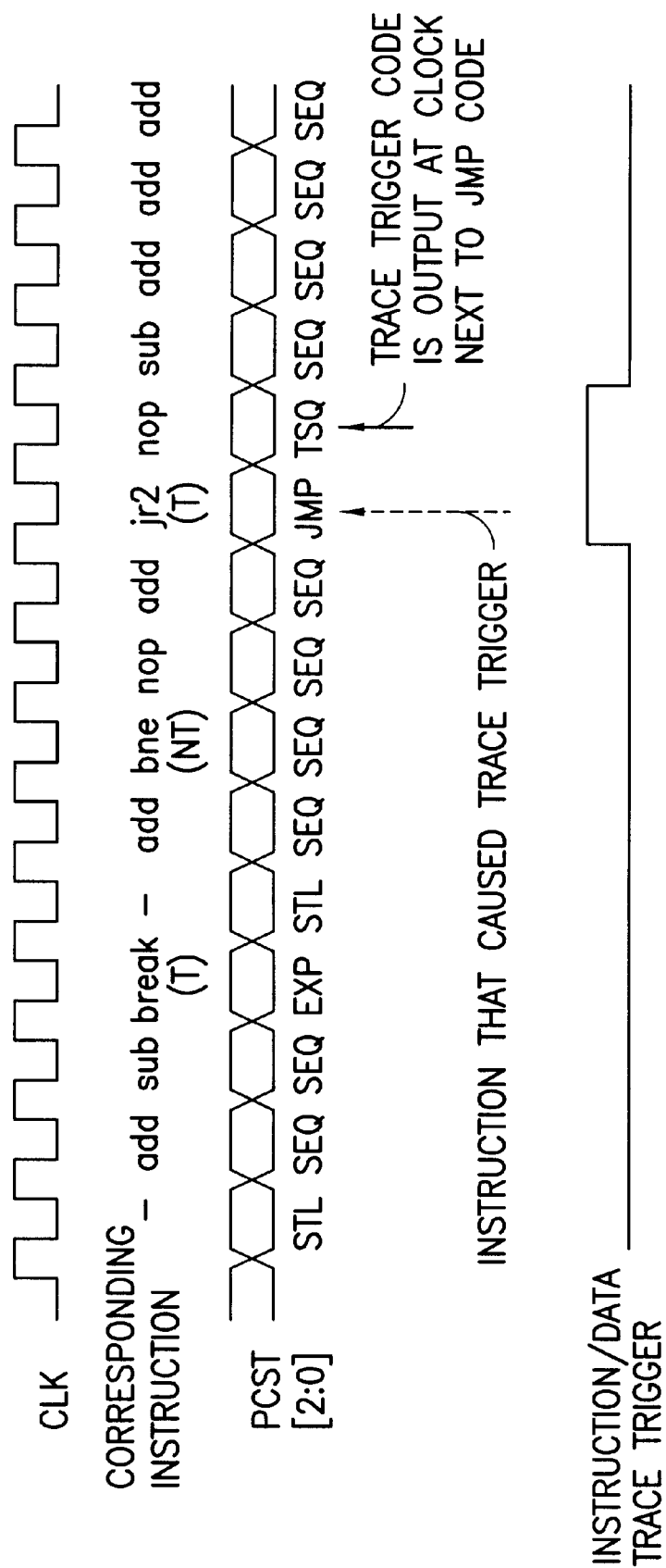
FIG. 19: Timing chart of an example of a case in which a trace trigger occurred during the execution of an indirect jump instruction.

Example of the case in which a trace trigger occurs during an indirect jump instruction execution: FIG. 19 shows an example of a case in which a trace trigger occurs during an indirect jump instruction execution. The trace trigger occurs during the execution of the indirect jmp instruction jr2, but the code JMP of the jump is output to the PCST[2:0] signal in the clock of the jr2 instruction execution, and the code of the trace trigger is output in the next clock. In this example, since the status of the next clock is an instruction execution status, the TSQ code is output.

Explanation of the Trace Memory Interface Circuit

Figure 20:
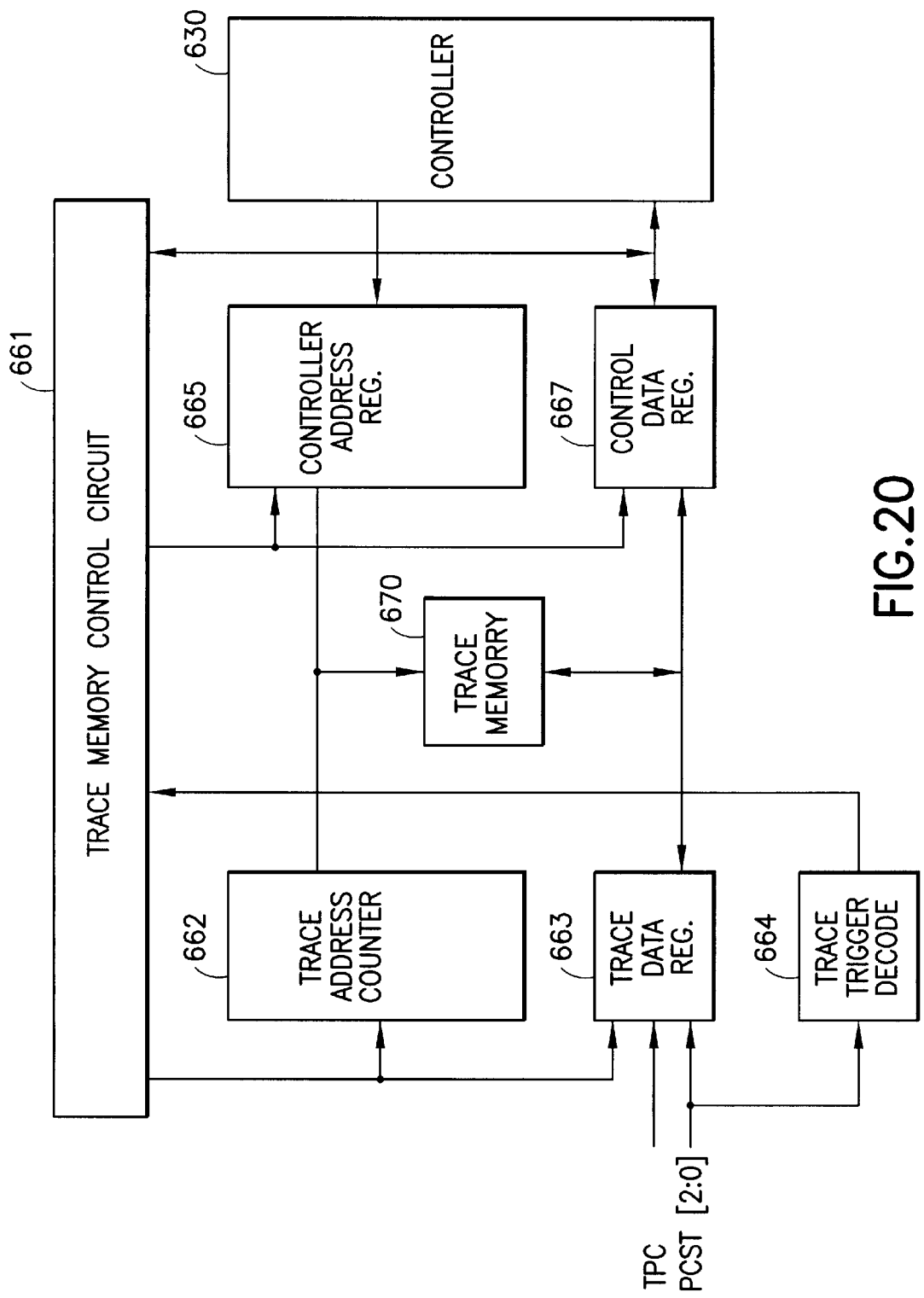
FIG. 20: Diagram showing the structure of the trace memory interface and the trace memory in the debugging tool 60.

FIG. 20 shows a diagram of trace memory interface 660 and trace memory 670 in debugging tool 60.

The TPC and PCST[2:0] outputs from debugging module 60 are written to trace memory 670 through trace data register 663. The value of the address at this time is supplied from race address counter 662. The PCST[2:0] is also input to trace trigger decoder 664, and the occurrence of the trace trigger is informed to trace memory control circuit 661. The setting of the initial value of the trace address counter and the indication of increment/stop are performed by trace memory control circuit 661 based on the output results of trace trigger decoder 664.

When controller 630 reads out the contents of trace memory 670, the address is set in the controller address register, and when a read request is sent to trace memory controller circuit 661, the data are read into controller data register 667. Then the controller reads it out.

When controller 630 writes the data into trace memory 670, the address is set in controller address register 665, the data are set in controller data register 667, and a write request is sent to trace memory controller circuit 661.

Detailed Explanation of Reduction of Power Consumption

Figure 21:
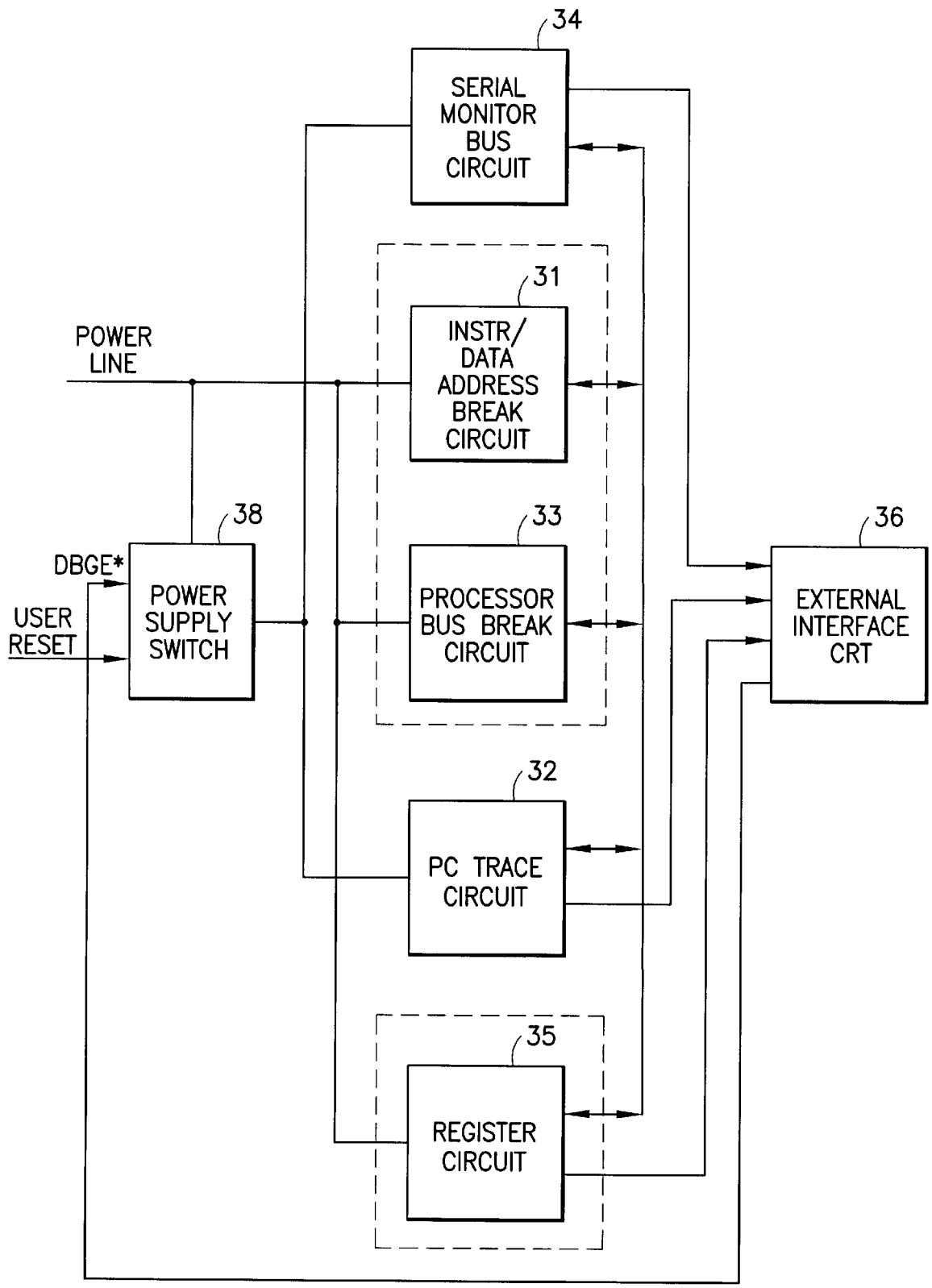
FIG. 21: Diagram showing the structure of the power supply part of the debugging module.

FIG. 21 shows the structure of the power feed in the debugging module. When the debugging tool is not connected, the signal DBGE* becomes high-level. At the time of a user reset, if this DBGE* signal is at high-level, the power supply switch 38 is turned off, and no power is fed to the serial monitor bus circuit 34 or the PC trace circuit 32. Since there is no reason to use these circuits when no external debugging tool is connected, the power consumption in the microprocessor as a whole can be reduced by not feeding power.

Even when the debugging tool is not connected, power is fed to instruction/data address break circuit 31, processor bus break circuit 33, and register circuit 35, and to the functions of the instruction/data address break and processor bus break functions. By changing the vector addresses of the debugging exceptions to the user region, the user can use these hardware break functions in debugging applications.

Detailed Explanation of the Debugging Module Initialization Circuit

Figure 22:
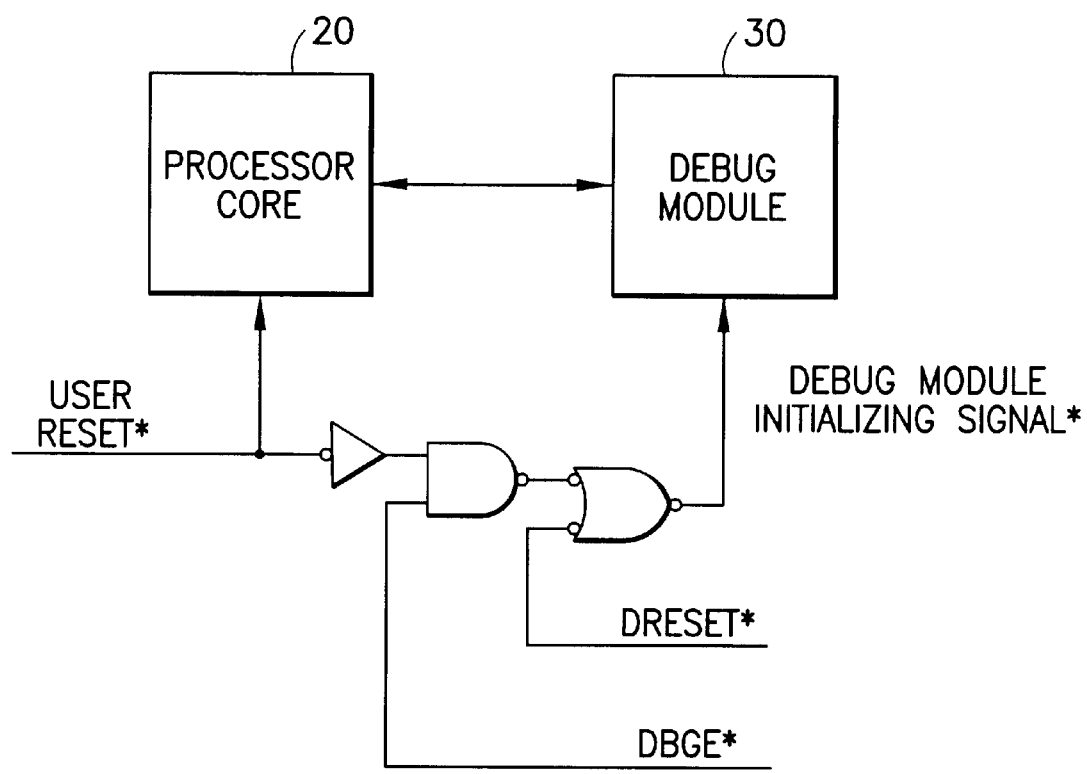
FIG. 22: Diagram showing the structure of the initialization circuit of the debugging module.

FIG. 22 shows the debugging module initialization circuit. Since the DBGE* is at high level when the debugging module is not connected, when a user reset is asserted, a debugging module initialization signal is asserted, and the debugging module 30 is initialized.

Even when the debugging tool is not connected, there is a possibility that the debugging module will switch into a wrong state due to power line noise or the like and might request an interrupt to processor core 20. Since the debugging tool is not connected, the debug reset (DRESET*) signal cannot be driven. If the debugging module cannot be initialized by a user reset, there is no means for initializing this debugging module. Therefore, when the debugging tool is not connected, it is extremely important for a user reset to initialize the debugging module.

Conversely, when the debugging tool is connected, the DBGE* becomes low-level; therefore, even if a user reset is asserted, a debugging module in initialization signal is not asserted, and the debugging module 30 is not initialized.

This operation is extremely effective in cases where one wants to allow a trace trigger to occur immediately after a user reset, etc. If the user reset initialized the debugging module 30, it would be necessary, for example, to temporarily enter the debugging mode to reset the necessary register to allow a trace trigger to occur. However, by entering the debugging mode, real time operation would be impaired during this period, and it would be likely that the phenomena which is sought might not be captured.

Even in cases where the debugging module itself malfunctions due to power line noise or the like when the debugging tool is connected, the debug reset (DRESET*) can be initialized from the debugging tool, and therefore there is no problem.

Effects of Invention

As explained above, the following effects are obtained by the present invention, compared to the examples of the prior art.

Compared to example 1 of the prior art, the following effects are obtained:

Since special debugging exceptions are provided for entering the monitor, restrictions are not placed on user interrupts.

It is not necessary to provide a serial interface for the user target system.

Hardware breakpoints can be used.

Compared to example 2 of the prior art, the following effects are obtained:

Since it is not necessary to have a sequencer in the microprocessor, the logic circuits for debugging added inside the microprocessor are simple.

Since the registers are accessed by the monitor program, even when registers are added in a derivative processor, it is possible to easily access them merely by changing the monitor.

For the two reasons above, even when a number of kinds of peripheral circuits are added to the microprocessor core, common logic circuits can be used for debugging. By putting this common module into the microprocessor as a part of the peripheral circuits, a common debugging tool can be applied to a variety of derivative microprocessors with a common processor core and different peripheral circuits.

Compared to example 3 of the prior art, the following effects are obtained:

The hardware specification of debugging tools can be made common.

The number of signals for connecting with debugging tools is reduced.

For this reason, probes can be made smaller and less expensive.

Since the microprocessor on the user target accesses memory and I/O, the timing conditions required in the debugging tool are improved.

There are no effects on signals not connected to the debugging tool.

If desired, the communication speed between the debugger tool and the microprocessor can be slowed down.

For this reason, it can also be applied to high-speed microprocessors.

Compared to example 4 of the prior art, the following effects are obtained:

Using the debugging tool, access to the target memory and I/O and execution control can be realized.

The address information for instructions which have been executed in the cache memory can also be traced.

We claim:

1. In a debugging system for debugging an application program for a microprocessor, said microprocessor comprising:

first logic means comprising a debug module for running a monitor program accessed via a dedicated debut interface from a monitor memory in a debugging tool located outside said microprocessor;

second logic means comprising a processor core for controlling execution of a user program containing hardware breakpoints; and third logic means for tracing said user program and for providing trace information via said debut module to said debugging tool.

2. A tracing method for handling signals between a microprocessor and a debugging tool located outside said microprocessor, comprising the steps of:

in case the microprocessor has:

a. executed an instruction at a preset address, b. accessed data at a preset address, c. written preset data at a preset address, or d. read preset data from a preset address, sensing occurrence of any events a–d in said debugging tool via a signal pin coupling said microprocessor and said debugging tool and dedicated to signal transmissions between said microprocessor and said debugging tool; and upon such occurrence, deciding the timing of a start or stop of storing trace information into a trace memory of said debugging tool.

* * * * *

UNITED STATES PATENT AND TRADEMARK OFFICE
CERTIFICATE OF CORRECTION

PATENT NO.: 5,943,498

DATED: August 24, 1999

INVENTOR(S): Yano, T. et al.

It is certified that error appears in the above-identified patent and that said Letters Patent is hereby corrected as shown below:

<u>IN THE CLAIMS</u>

Claim 1, column 19, line 14, please correct "debut" to read -- debug -- .

Claim 1, column 19, line 21, please correct "debut" to read -- debug -- .

Signed and Sealed this

Fifteenth Day of May, 2001

NICHOLAS P. GODICI

*Attest:*

*Attesting Officer*  *Acting Director of the United States Patent and Trademark Office*